United States Patent
Richert

(10) Patent No.: US 8,977,582 B2
(45) Date of Patent: Mar. 10, 2015

(54) SPIKING NEURON NETWORK SENSORY PROCESSING APPARATUS AND METHODS

(75) Inventor: Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 273 days.

(21) Appl. No.: 13/548,071

(22) Filed: Jul. 12, 2012

(65) Prior Publication Data

US 2014/0016858 A1    Jan. 16, 2014

(51) Int. Cl.

| | |
|---|---|
| *G06K 9/62* | (2006.01) |
| *G06F 15/18* | (2006.01) |
| *G06K 9/46* | (2006.01) |
| *G06N 3/04* | (2006.01) |
| *G06N 3/10* | (2006.01) |

(52) U.S. Cl.
CPC ............... *G06K 9/62* (2013.01); *G06K 9/4671* (2013.01); *G06N 3/049* (2013.01); *G06N 3/10* (2013.01)
USPC ............................................ 706/15; 382/156

(58) Field of Classification Search
None
See application file for complete search history.

(56) References Cited

U.S. PATENT DOCUMENTS

| | | | |
|---|---|---|---|
| 5,138,447 A | 8/1992 | Shen et al. | |
| 5,272,535 A | 12/1993 | Elabd | |
| 5,355,435 A | 10/1994 | Deyong et al. | |
| 5,638,359 A | 6/1997 | Peltola et al. | |
| 6,418,424 B1 | 7/2002 | Hoffberg et al. | |
| 6,458,157 B1 | 10/2002 | Suaning | |
| 6,545,705 B1 | 4/2003 | Sigel et al. | |
| 6,546,291 B2 | 4/2003 | Merfeld et al. | |
| 6,625,317 B1 | 9/2003 | Gaffin et al. | |
| 7,580,907 B1 | 8/2009 | Rhodes | |
| 7,653,255 B2 | 1/2010 | Rastogi | |
| 7,737,933 B2 | 6/2010 | Yamano et al. | |
| 8,000,967 B2 | 8/2011 | Taleb | |
| 8,416,847 B2 | 4/2013 | Roman | |
| 2002/0038294 A1 | 3/2002 | Matsugu | |
| 2003/0216919 A1 | 11/2003 | Roushar | |
| 2004/0193670 A1 | 9/2004 | Langan et al. | |
| 2005/0036649 A1 | 2/2005 | Yokono et al. | |
| 2005/0283450 A1 | 12/2005 | Matsugu | |

(Continued)

FOREIGN PATENT DOCUMENTS

JP    4087423    3/1992

OTHER PUBLICATIONS

Berkes and Wiskott. Slow feature analysis yields a rich repertoire of complex cell properties. *Journal of Vision* (2005) vol. 5 (6).

(Continued)

*Primary Examiner* — Alan Chen
(74) *Attorney, Agent, or Firm* — Gazdzinski & Associates, PC

(57) ABSTRACT

Apparatus and methods for detecting salient features. In one implementation, an image processing apparatus utilizes latency coding and a spiking neuron network to encode image brightness into spike latency. The spike latency is compared to a saliency window in order to detect early responding neurons. Salient features of the image are associated with the early responding neurons. A dedicated inhibitory neuron receives salient feature indication and provides inhibitory signal to the remaining neurons within the network. The inhibition signal reduces probability of responses by the remaining neurons thereby facilitating salient feature detection within the image by the network. Salient feature detection can be used for example for image compression, background removal and content distribution.

22 Claims, 16 Drawing Sheets

(56) References Cited

U.S. PATENT DOCUMENTS

| | | | |
|---|---|---|---|
| 2006/0161218 | A1 | 7/2006 | Danilov |
| 2007/0022068 | A1 | 1/2007 | Linsker |
| 2007/0208678 | A1 | 9/2007 | Matsugu |
| 2009/0287624 | A1* | 11/2009 | Rouat et al. .................. 706/20 |
| 2010/0086171 | A1 | 4/2010 | Lapstun |
| 2010/0166320 | A1 | 7/2010 | Paquier |
| 2010/0235310 | A1 | 9/2010 | Gage et al. |
| 2010/0299296 | A1 | 11/2010 | Modha et al. |
| 2011/0137843 | A1 | 6/2011 | Poon et al. |
| 2012/0084240 | A1 | 4/2012 | Esser et al. |
| 2012/0303091 | A1 | 11/2012 | Izhikevich |
| 2012/0308076 | A1 | 12/2012 | Piekniewski et al. |
| 2012/0308136 | A1 | 12/2012 | Izhikevich |
| 2013/0297539 | A1 | 11/2013 | Piekniewski et al. |
| 2013/0297541 | A1 | 11/2013 | Piekniewski et al. |
| 2013/0297542 | A1 | 11/2013 | Piekniewski et al. |
| 2013/0325766 | A1 | 12/2013 | Petre et al. |
| 2013/0325777 | A1 | 12/2013 | Petre et al. |
| 2014/0012788 | A1 | 1/2014 | Piekniewski |
| 2014/0016858 | A1 | 1/2014 | Richert |
| 2014/0064609 | A1 | 3/2014 | Petre et al. |
| 2014/0122397 | A1 | 5/2014 | Richert |
| 2014/0122398 | A1 | 5/2014 | Richert |
| 2014/0122399 | A1 | 5/2014 | Szatmary |
| 2014/0156574 | A1 | 6/2014 | Piekniewski et al. |

OTHER PUBLICATIONS

Field, G.; Chichilnisky, E. Information Processing in the Primate Retina: Circuitry and Coding. *Annual Review of Neuroscience*, 2007, 30(1), 1-30.

Fiete, et al. Spike-Time-Dependent Plasticity and Heterosynaptic Competition Organize Networks to Produce Long Scale-Free Sequences of Neural Activity. *Neuron* 65, Feb. 25, 2010, pp. 563-576.

Földiák, P. Learning invariance from transformation sequences. *Neural Computation*, 1991, 3(2), 194-200.

Gerstner et al. (1996) A neuronal learning rule for sub-millisecond temporal coding. *Nature* vol. 383 (6595) pp. 7678.

Hopfield JJ (1995) Pattern recognition computation using action potential timing for stimulus representation. *Nature* 376: 33-36.

Izhikevich E. M. and Hoppensteadt F.C. (2009) Polychronous Wavefront Computations. *International Journal of Bifurcation and Chaos*, 19:1733-1739.

Izhikevich E.M. (2004) Which Model to Use for Cortical Spiking Neurons? *IEEE Transactions on Neural Networks*, 15:1063-1070.

Izhikevich E.M. (2006) Polychronization: Computation With Spikes. *Neural Computation*,18:245-282.

Izhikevich, E.M. (2007) Dynamical Systems in Neuroscience: The Geometry of Excitability and Bursting, *The MIT Press*, 2007.

Janowitz, M.K.; Van Rossum, M.C.W. Excitability changes that complement Hebbian learning. *Network, Computation in Neural Systems*, 2006, 17 (1), 31-41.

Khotanzad, Alireza, Classification of invariant image representations using a neural network, IEEF. Transactions on Acoustics, Speech, and Signal Processing vol. 38 No. 6 Jun. 1990 pp. 1028-1038.

Knoblauch, et al. Memory Capacities for Synaptic and Structural Plasticity, *Neural Computation* 2009, pp. 1-45.

Masquelier and Thorpe. Learning to recognize objects using waves of spikes and Spike Timing-Dependent Plasticity. *Neural Networks* (IJCNN), The 2010 International Joint Conference on DOI—10.1109/IJCNN.2010.5596934 (2010) pp. 1-8.

Meister, M. Multineuronal codes in retinal signaling. *Proceedings of the National Academy of sciences*. 1996, 93, 609-614.

Meister, M.; Berry, M.J. The neural code of the retina, *Neuron*. 1999, 22, 435-450.

Oster M., Lichtsteiner P., Delbruck T, Liu S. A Spike-Based Saccadic Recognition System. *ISCAS 2007. IEEE International Symposium on Circuits and Systems*, 2009, pp. 3083-3086.

Rekeczky, et al., "Cellular Multiadaptive Analogic Architecture: A Computational Framework for UAV Applications." May 2004.

Revow M., Williams C., and Hinton, G.E., 1996, Using Generative Models for Handwritten Digit Recognition, *IEEE Trans. on Pattern Analysis and Machine Intelligence*, 18, No. 6, Jun. 1996.

Sanchez, Efficient Simulation Scheme for Spiking Neural Networks, *Doctoral Thesis, Universita di Granada* Mar. 28, 2008, pp. 1-104.

Schemmel, J., et al. Implementing synaptic plasticity in a VLSI spiking neural network model, Proceedings of the 2006 International Joint Conference on Neural Networks, Jul. 2006 pp. 1-6.

Schnitzer, M.J.; Meister, M.; Multineuronal Firing Patterns in the Signal from Eye to Brain. *Neuron*, 2003, 37, 499-511.

Serrano-Gotarredona, et al, "On Real-Time: AER 2-D Convolutions Hardware for Neuromorphic Spike-based Cortical Processing", Jul. 2008.

Sjostrom J., W. Gerstner. Spike-Timing Dependent Plasticity. *Scholarpedia*, [Online], 2010, 5(2), 1362.

Szatmary B. and Izhikevich E. M. (2010) Spike-Timing Theory of Working Memory. *PLoS Computational Biology*, 6(8): e1000879.

Thomas S. and Riesenhuber, M, 2004, Realistic Modeling of Simple and Complex Cell Tuning in the HMAX Model, and Implications for Invariant Object Recognition in Cortex, *Al Memo* 2004-017 Jul. 2004.

Thorpe S.; Ultra-Rapid Scene Categorization with a Wave of Spikes. In H.H. Bulthoff et al. (eds.), *Biologically Motivated Computer Vision, Lecture Notes in Computer Science*, 2002, 2525, pp. 1-15, Springer-Verlag, Berlin.

Thorpe, S.J., Delorme, A. & VanRullen, R. (2001). Spike-based strategies for rapid processing. *Neural Networks* 14, pp. 715-725.

Thorpe, S.J., Guyonneau, R., Guilbaud, N., Allegraud, J-M, & VanRullen, R. (2004). SpikeNet: real-time visual processing with one spike per neuron. *Neurocomputing*, 58-60, pp. 857-864.

Tim Gollisch* and Markus Meister (2008) Rapid Neural Coding in the Retina with Relative Spike Latencies, *Science* 319:1108-1111.

Van Wien R.; Thorpe, S. Rate Coding versus temporal order coding: What the Retinal ganglion cells tell the visual cortex. *Neural computation*, 2001, 13, 1255-1283.

VanRullen, R. & Koch, C. (2003). Is perception discrete or continuous? *Trends in Cognitive Sciences* 7(5), pp. 207-213.

VanRullen, R., Guyonneau, R. & Thorpe, S.J. (2005). Spike times make sense. *Trends in Neurosciences* 28(1).

Wallis, G.; Rolls, E. T. A model of invariant object recognition in the visual system. *Progress in Neurobiology*. 1997, 51, 167-194.

Wiskott, L.; Sejnowski, T.J. Slow feature analysis: Unsupervised learning of invariances. *Neural Computation*, 2002, 14, (4), 715-770.

Zarandy, et al., "Bi-i: A Standalone Ultra High Speed Cellular Vision System", Jun. 2005.

\* cited by examiner

US 8,977,582 B2

SPIKING NEURON NETWORK SENSORY PROCESSING APPARATUS AND METHODS

CROSS-REFERENCE TO RELATED APPLICATIONS

This application is related to a co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, U.S. patent application Ser. No. 13/541,531, entitled "CONDITIONAL PLASTICITY SPIKING NEURON NETWORK APPARATUS AND METHODS", filed Jul. 3, 2012, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field of the Disclosure

The present innovation relates generally to artificial neuron networks, and more particularly in one exemplary aspect to computer apparatus and methods for encoding visual input using spiking neuron networks.

2. Description of Related Art

Targeting visual objects is often required in a variety of applications, including education, content distribution (advertising), safety, etc. Existing approaches (such as use of heuristic rules, eye tracking, etc.) are often inadequate in describing salient features in visual input, particularly in the presence of variable brightness and/or color content that is rapidly variable (spatially and/or temporally). Furthermore, while spiking neuron networks have been used to encode visual information, visual attention implementations comprising spiking neuron networks are often overly complex, and may not always provide sufficiently fast response to changing input conditions.

Accordingly, there is a need for apparatus and methods for implementing visual encoding of salient features, which provide inter alia, improved temporal and spatial response.

SUMMARY

The present disclosure satisfies the foregoing needs by providing, inter alia, apparatus and methods for detecting salient features in sensory input.

In one aspect of the disclosure, a computerized neuron-based network image processing apparatus is disclosed. In one implementation, the apparatus includes a storage medium comprising a plurality of executable instructions being configured to, when executed: provide feed-forward stimulus associated with a first portion of an image to at least a first plurality of neurons and second plurality of neurons of said network; provide another feed-forward stimulus associated with another portion of said image to at least third plurality of neurons of said network; cause said first plurality of neurons to encode a first attribute of said first portion into a first plurality of pulse latencies relative to an image onset time; cause said second plurality of neurons to encode a second attribute of said first portion into a second plurality of pulse latencies relative said onset time, said second attribute characterizing a different physical characteristic of said image than said first attribute; determine an inhibition indication, based at least in part on one or more pulses of said first plurality and said second plurality of pulses, that are characterized by latencies that are within a latency window; and based at least in part on said inhibition indication, prevent encoding of said another portion by said third plurality of neurons.

In a second aspect of the invention, a computerized method of detection of one or more salient features of an image by a spiking neuron network is disclosed. In one implementation, the method includes: providing feed-forward stimulus comprising a spectral parameter of said image to a first portion and a second portion of said network; based at least in part on said providing said stimulus, causing generation of a plurality of pulses by said first portion, said plurality of pulses configured to encode said parameter into pulse latency; generating an inhibition signal based at least in part on two or more pulses of said plurality of pulses being proximate one another within a time interval; and based at least in part on said inhibition indication, suppressing responses to said stimulus by at least some neurons of said second portion.

In another aspect of the invention, a spiking neuron sensory processing system is disclosed. In one implementation, the system includes: an encoder apparatus comprising: a plurality of excitatory neurons configured to encode feed-forward sensory stimulus into a plurality of pulses; and at least one inhibitory neuron configured to provide an inhibitory indication to one or more of said plurality of excitatory neurons over a one or more inhibitory connections. In one variant, said inhibitory indication is based at least in part on two or more of said plurality of pulses being received by said at least one inhibitory neuron over one or more feed-forward connections; and said inhibitory indication is configured to of prevent at least one of said plurality of excitatory neurons from generating at least one pulse during a stimulus interval subsequent to said provision of said inhibitory indication.

In another aspect of the invention, a "winner take all" methodology for processing sensory inputs is disclosed. In one implementation, the winner is determined in a spatial context. In another embodiment, the winner is considered in a temporal context.

In another aspect, a computer readable apparatus is disclosed. In one embodiment, the apparatus comprises logic which, when executed, implements the aforementioned "winner takes all" functionality.

In another aspect of the invention, a method of reducing background or non-salient image data is disclosed.

In yet another aspect, a robotic device having salient feature detection functionality is disclosed.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

Figure 1:
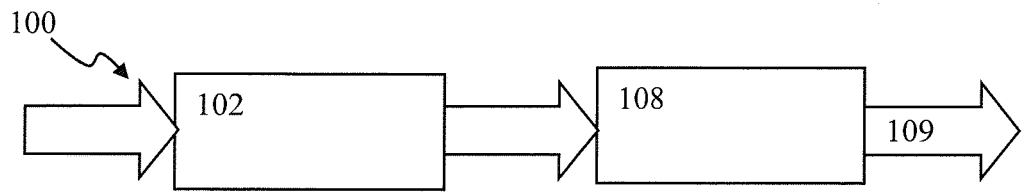
FIG. 1 is a block diagram illustrating a salient feature detection apparatus in accordance with one implementation of the disclosure.

All Figures disclosed herein are ©Copyright 2012 Brain Corporation. All rights reserved.

DETAILED DESCRIPTION

Implementations of the present disclosure will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of or combination with some or all of the described or illustrated elements. Wherever convenient, the same reference numbers will be used throughout the drawings to refer to same or like parts.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation In the present disclosure, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" could be optical, wireless, infrared or another type of communication medium. The exact topology of the bus could be for example standard "bus", hierarchical bus, network-on-chip, address-event-representation (AER) connection, or other type of communication topology used for accessing, e.g., different memories in pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions and processing an incoming data signal.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

As used herein, the terms "connection", "link", "transmission channel", "delay line", "wireless" means a causal link between any two or more entities (whether physical or logical/virtual), which enables information exchange between the entities.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), PAN (e.g., 802.15), cellular (e.g., 3G, LTE/LTE-A/TD-LTE, GSM, etc.) or IrDA families.

As used herein, the terms "pulse", "spike", "burst of spikes", and "pulse train" are meant generally to refer to, without limitation, any type of a pulsed signal, e.g., a rapid change in some characteristic of a signal, e.g., amplitude, intensity, phase or frequency, from a baseline value to a higher or lower value, followed by a rapid return to the baseline value and may refer to any of a single spike, a burst of spikes, an electronic pulse, a pulse in voltage, a pulse in electrical current, a software representation of a pulse and/or burst of pulses, a software message representing a discrete pulsed event, and any other pulse or pulse type associated with a discrete information transmission system or mechanism.

As used herein, the terms "pulse latency", "absolute latency", and "latency" are meant generally to refer to, without limitation, a temporal delay offset between an event (e.g., the onset of a stimulus, an initial pulse, or just a point in time) and a pulse.

As used herein, the terms "pulse group latency", or "pulse pattern latency" refer to, without limitation, an absolute latency of a group (pattern) of pulses that is expressed as a latency of the earliest pulse within the group.

As used herein, the term "relative pulse latencies" refers to, without limitation, a latency pattern or distribution within a group (or pattern) of pulses that is referenced with respect to the pulse group latency.

As used herein, the term "pulse-code" is meant generally to denote, without limitation, information encoding into a patterns of pulses (or pulse latencies) along a single pulsed channel or relative pulse latencies along multiple channels.

As used herein, the term "synaptic channel", "connection", "link", "transmission channel", "delay line", and "communications channel" are meant generally to denote, without limitation, a link between any two or more entities (whether physical (wired or wireless), or logical/virtual) which enables information exchange between the entities, and is characterized by a one or more variables affecting the information exchange.

As used herein, the term "Wi-Fi" refers to, without limitation, any of the variants of IEEE-Std. 802.11 or related standards including 802.11a/b/g/n/s/v and 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one aspect of the invention, improved apparatus and methods for encoding salient features in visual information, such as a digital image frame, are disclosed. In one implementation, the encoder apparatus may comprise a spiking neuron network configured to encode spectral illuminance (i.e., brightness and/or color) of visual input into spike latency. The input data may comprise sensory input provided by a lens and/or imaging pixel array, such as an array of digitized pixel values. Spike latency may be determined with respect to one another (spike lag), or with respect to a reference event (e.g., an onset of a frame, an introduction of an object into a field of view, etc.).

In one or more implementations, the latency may be configured inversely proportional to luminance of an area of the image, relative to the average luminance within the frame. Accordingly, the fastest response neurons (i.e., the spikes with the shortest latency) may correspond to the brightest and/or darkest elements within the image frame. The elements meeting certain criteria (e.g., much different brightness, as compared to the average) may be denoted as "salient features" within the image frame. accost In one or more implementations, one or more partitions of the spiking neuron network may be configured to encode two or more sensory input attributes. For instance, the input may comprise an image, and the two attributes may comprise pixel contrast and pixel rate of displacement. In some implementations, the image may include a salient feature. The spike latency is associated with (i) the contrast; and (ii) the displacement of the pixels corresponding to the feature, and may fall proximate one another within a latency range. Spike latencies associated with more than one aspect of the image may, inter alia, aid the network in detection of feature saliency.

In accordance with one aspect of the disclosure, the aforementioned fast response or "first responder" neurons may be coupled to one or more inhibitory neurons, also referred to as "gate units". These gate neurons may provide inhibitory signals to the remaining neuron population (i.e., the neurons that have not responded yet). Such inhibition (also referred to herein colloquially as "temporal winner takes all") may prevent the rest of the network from responding to the remaining features, thereby effectuating salient feature encoding, in accordance with one or more implementations.

Saliency Detection Apparatus

Detailed descriptions of various implementations of the apparatus and methods of the disclosure are now provided. Although certain aspects of the innovations set forth herein can best be understood in the context of encoding digitized images, the principles of the disclosure are not so limited and implementations of the disclosure may also be used for implementing visual processing in, for example a handheld communications devices. In one such implementation, an encoding system may include a processor embodied in an application specific integrated circuit, which can be adapted or configured for use in an embedded application (such as a prosthetic device).

Realizations of the innovations may be for example deployed in a hardware and/or software implementation of a neuromorphic computerized system.

FIG. 1 illustrates one exemplary implementation of salient feature detection apparatus of the disclosure. The apparatus 100 of FIG. 1 may be configured to receive sensory input 104, detect a salient feature within the input, and to generate salient feature indication 109. The saliency of an item (such as an object, a person, a pixel, etc.) may be described by a state or quality by which the item stands out relative to its neighbors. Saliency may arise from contrast between the item and its surroundings, such as a black object on a white background, or a rough scrape on a smooth surface.

The input may take any number of different forms, including e.g., sensory input of one or more modalities (e.g., visual and/or touch), electromagnetic (EM) waves (e.g., in visible, infrared, and/or radio-frequency portion of the EM spectrum) input provided by an appropriate interface (e.g., a lens and/or antenna), an array of digitized pixel values from a digital image device (e.g., a camcorder, media content server, etc.), or an array of analog and/or digital pixel values from an imaging array (e.g., a charge-coupled device (CCD) and/or an active-pixel sensor array).

Figure 1A:
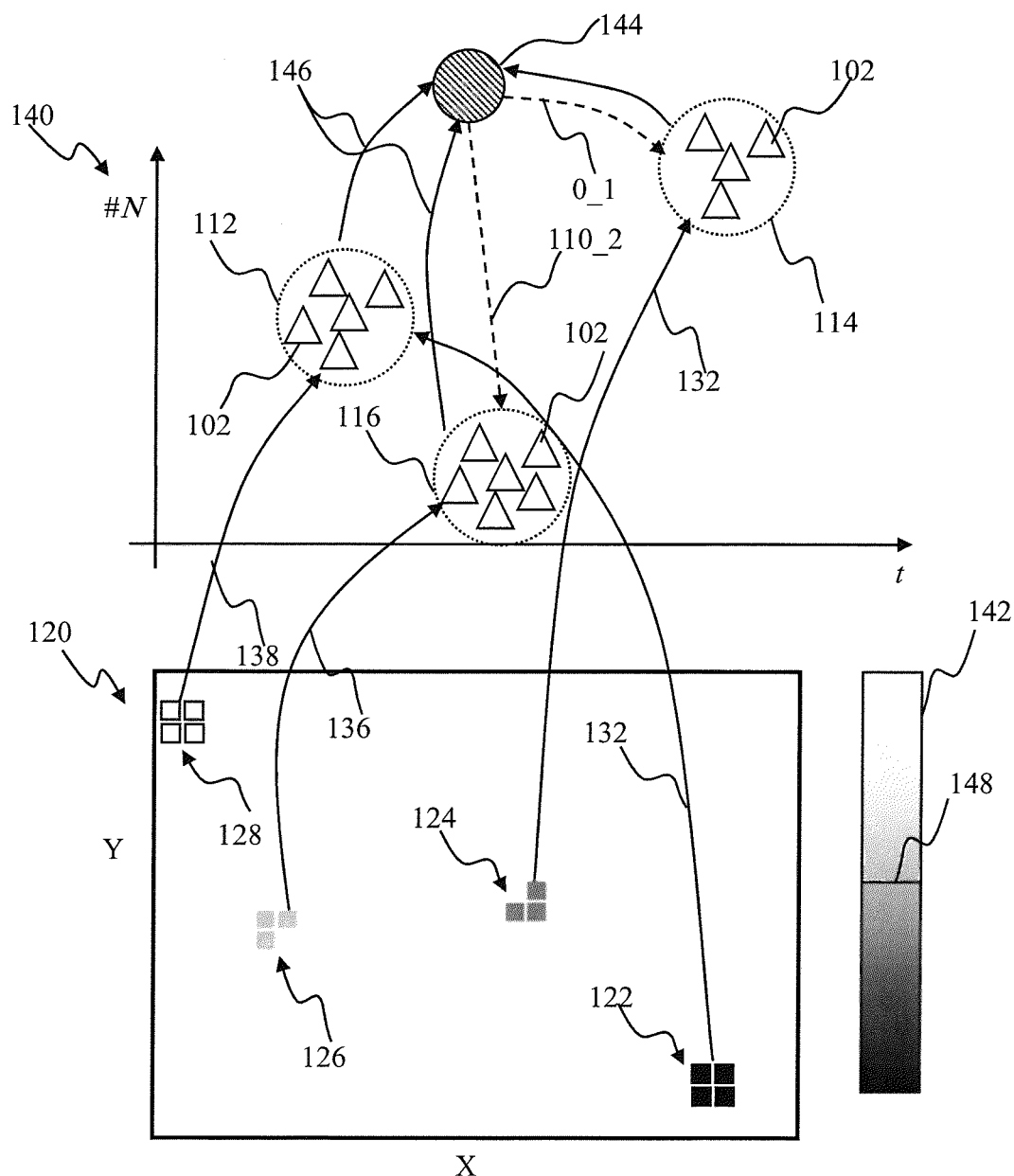
FIG. 1A is a graphical illustration of a temporal "winner takes all" saliency detection mechanism in accordance with one implementation of the disclosure.

In certain implementations, the input comprises pixels arranged in a two-dimensional array 120, as illustrated in FIG. 1A. The pixels may form one or more features 122, 124, 126, 128 that may be characterized by a spectral illuminance parameter such as e.g., contrast, color, and/or brightness, as illustrated by the frame 120 in FIG. 1A. The frame brightness may be characterized by a color map, comprising, for example, a gray scale mapping 142 illustrated in FIG. 1A.

The apparatus 100 of FIG. 1 comprises an encoder block 102 configured to encode the input 104. In one or more implementations, the encoder 102 may comprise spiking neuron network, capable of encoding the spectral illuminance parameter of the input frame 120 into a spike latency as described in detail, for example, in U.S. patent application Ser. No. 12/869,573, entitled "SYSTEMS AND METHODS FOR INVARIANT PULSE LATENCY CODING", filed Aug. 26, 2010, incorporated herein by reference in its entirety.

The apparatus 100 of FIG. 1 also comprises a detection block 108, configured to receive the encoded signal 106. In some implementations, the detector 108 may be configured to receive the spike output 106, generated by the network of the block 102. The detection block 108 may in certain exemplary configurations be adapted to generate the output 109 indication using the temporal-winner-takes-all (TWTA) salient feature detection methodology, shown and described with respect to FIG. 1A below.

FIG. 1A illustrates one exemplary realization of the TWTA methodology. It is noteworthy that the designator "temporal-winner-takes-all" is used in the present context to denote signals (e.g., spikes) in the time domain that occur consistently prior to other signals. The rectangle 120 depicts the input image, characterized by spatial dimensions X, Y and luminance (e.g., brightness) L. In one or more implementations, the image luminance may be encoded into spike latency $\Delta t_i$ that is inversely proportional to the difference between the luminance of an area (e.g., one or more pixels) $L_i$ of the image, relative to a reference luminance $L_i$, as follows:

$$\Delta t_i \propto \frac{1}{|L_i - L_{ref}|}. \qquad \text{(Eqn. 1)}$$

In some implementations, the reference luminance $L_{ref}$ may comprise average luminance 148 of the image 120, as shown in FIG. 1A. Other realizations of the reference luminance $L_{ref}$ may be employed, such as, for example, a media (background) luminance.

In some implementations, the spike latency $\Delta t_i$ may be determined with respect to one another (spike lag), or with respect to a reference event (e.g., an onset of a frame, an introduction of an object into a field of view, etc.).

The panel 140 in FIG. 1A depicts a map of neuron units associated, for example, with the spiking neuron network of the encoder 102 of FIG. 1. The horizontal axis of the panel 140 denotes the encoded latency, while the vertical axis denotes the number #N of a unit (e.g., the neuron 102) that may have generated spikes, associated with the particular latency value $\Delta t_i$.

The group 112 depicts units that generate pulses with lowers latency and, therefore, are the first to-respond to the input stimulus of the image 120. In accordance with Eqn. 1, dark and/or bright pixel areas 122, 128 within the image 120 may cause the units within the group 112 to generate spikes, as indicated by the arrows 132, 138, respectively. The unit groups 116, 114 may correspond to areas within the image that are characterized by smaller luminance deviation from the reference value (e.g., the areas 126, 124 as indicated by the arrows 136, 134, respectively in FIG. 1A).

In some implementations, the detector block 108 of the apparatus 100 of FIG. 1 may include one or more detector units 144. The detector unit 144 may comprise logic configured to detect the winner units (e.g., the units within the group 112). The detection may be based in part for instance on the unit 144 receiving the feed-forward output 146 from the units of the unit groups 112, 114, 116. In some implementations, the detector unit accesses spike generation time table that may be maintained for the network of units 102. In one or implementations (not shown), the detection logic may be embedded within the units 102 augmented by the access to the spike generation time table of the network.

In some configurations, such as the implementation of FIG. 1A, the units 102 may each comprise an excitatory unit, and the detector unit 144 an inhibitory unit. The inhibitory unit(s) 144 may provide an inhibition indication to one or more excitatory units 102, such as via feedback connections (illustrated by the broken line arrows 110 in FIG. 1A). In some implementations, the inhibition indication may be based on the unit 144 detecting early activity (the "winner") group among the unit groups responding to the image (e.g., the group 112 of the unit groups 112, 114, 116 in FIG. 1A). The inhibition indication may be used to prevent units within the remaining groups (e.g., groups 114, 116 in FIG. 1A) from responding to their stimuli (e.g., the image pixel areas 124, 126). Accordingly, inhibition of the remaining units within the network that is based on the detection the first-to-respond (i.e., winner) units effectuates a temporal winner-takes-all saliency detection functionality.

In some implementations, the feed-forward connections 146 from excitatory units 102 to the inhibitory unit 144 are characterized by an adjustable parameter, such as e.g., a synaptic connection weight $w^e$. In some implementations, the inhibitory feedback connections (e.g., the connections 110_1, 110_2 in FIG. 1A) may be characterized by a feedback connection weight $w^i$. If desired, the synaptic weights $w^i$, $w^e$ may be adjusted using for instance spike timing dependent plasticity (STDP) rule, such as e.g., an inverse-STDP plasticity rule such as that described, for example, in a co-pending and co-owned U.S. patent application Ser. No. 13/465,924, entitled "SPIKING NEURAL NETWORK FEEDBACK APPARATUS AND METHODS", filed May 7, 2012 incorporated supra. In some implementations, the plasticity rule may comprise plasticity rule that is configured based on a target rate of spike generation (firing rate) by the excitatory units 102; one such implementation of conditional plasticity rule is described, for example, in U.S. patent application Ser. No. 13/541,531, entitled "CONDITIONAL PLASTICITY SPIKING NEURON NETWORK APPARATUS AND METHODS", filed Jul. 3, 2012, incorporated supra.

In some implementations, the inhibition indication may be determined based on spikes from one or more neurons within, for example, the group 112 in FIG. 1A, that may respond to spatially persistent (i.e., spatially salient) feature depicted by the pixels 122. The inhibition indication may also or alternatively be determined based on spikes from one or more neurons within, for example, the group 112 in FIG. 1A, that may respond to temporally persistent (i.e., temporally salient) feature, as illustrated in FIG. 2A below.

In one or more implementations, the excitatory units 102 may be operable in accordance with a dynamic and/or a stochastic unit process. In one such case, the unit response generation is based on evaluation of neuronal state, as described, for example in co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429, entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, and U.S. patent application Ser. No. 13/488,114, entitled "LEARNING APPARATUS AND METHODS USING PROBABILISTIC SPIKING NEURONS.", filed Jun. 4, 2012, each of the foregoing incorporated herein by reference in its entirety.

Figure 3:
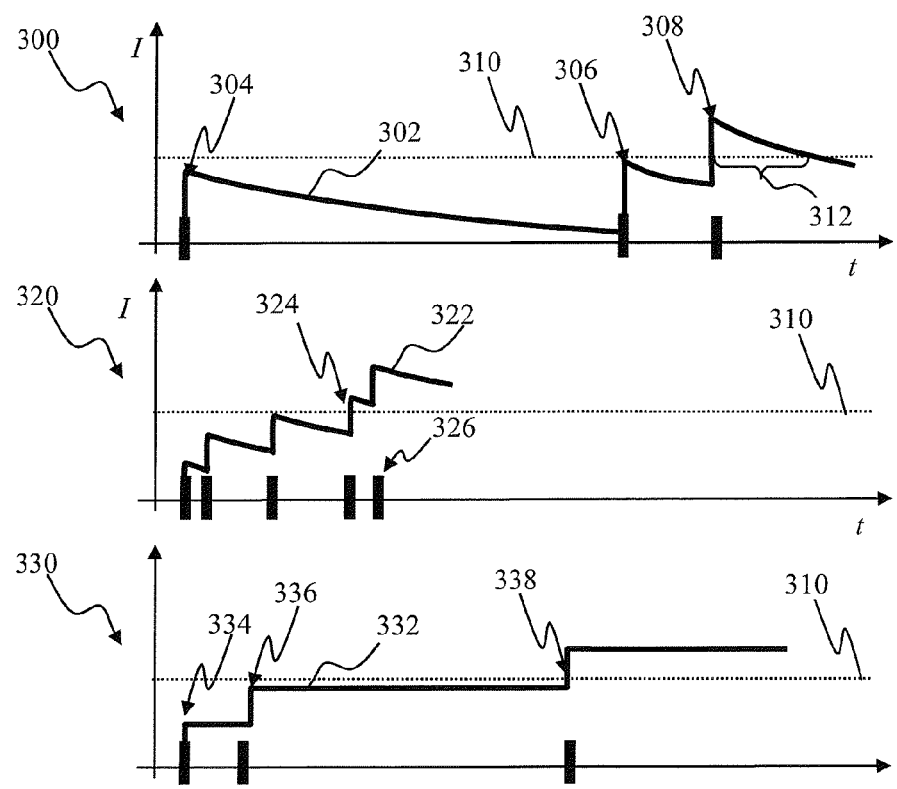
FIG. 3 is a graphical illustration depicting suppression of neuron responses to minor (background) features, in accordance with one implementation of the disclosure.

In one or more implementations, the inhibition indication may be determined based on one or more spikes generated by the 'winning' units (e.g., the units 102 of the group 112 in FIG. 1A), as illustrated in FIG. 3. The panel 300 of FIG. 3 depicts the time evolution of an inhibitory trace 302. The trace 302 may correspond for instance to a leaky integrate and fire spiking neuron process, such as e.g., that described in co-pending and co-owned U.S. patent application Ser. No. 13/487,533, entitled "STOCHASTIC SPIKING NETWORK LEARNING APPARATUS AND METHODS", Jun. 4, 2012, incorporated herein by reference in its entirety.

As illustrated in the panel 300, the inhibitory trace 302 is incremented (as shown by the arrows 304, 306, 308 in FIG. 3) each time an excitatory neuron generates an output, indicated by the vertical bars along the time axis of panel 300. The leaky nature of the neuron process causes the trace to decay with time in-between the increment events. In one implementation, the decay may be characterized by an exponentially decaying function of time. One or more inputs from the excitatory units may also cause the inhibitory trace 302 to rise above an inhibition threshold 310; the inhibitory trace that is above the threshold may cause for example a "hard" inhibition preventing any subsequent excitatory unit activity.

In some implementations (not shown) the excitatory neurons (e.g., the units 102 of FIG. 1A) comprise logic configured to implement inhibitory trace mechanism, such as, for example the mechanism of FIG. 3, described supra. In some implementations, the unit process associated with the excitatory units may be configured to incorporate the inhibitory mechanism described above. In one such case, the inhibitory connections (e.g., the connections 110 of FIG. 1A) may comprise parameters that are internal to the respective neuron, thereby alleviating the need for a separate inhibitory unit and/or inhibitory connections.

Figure 2:
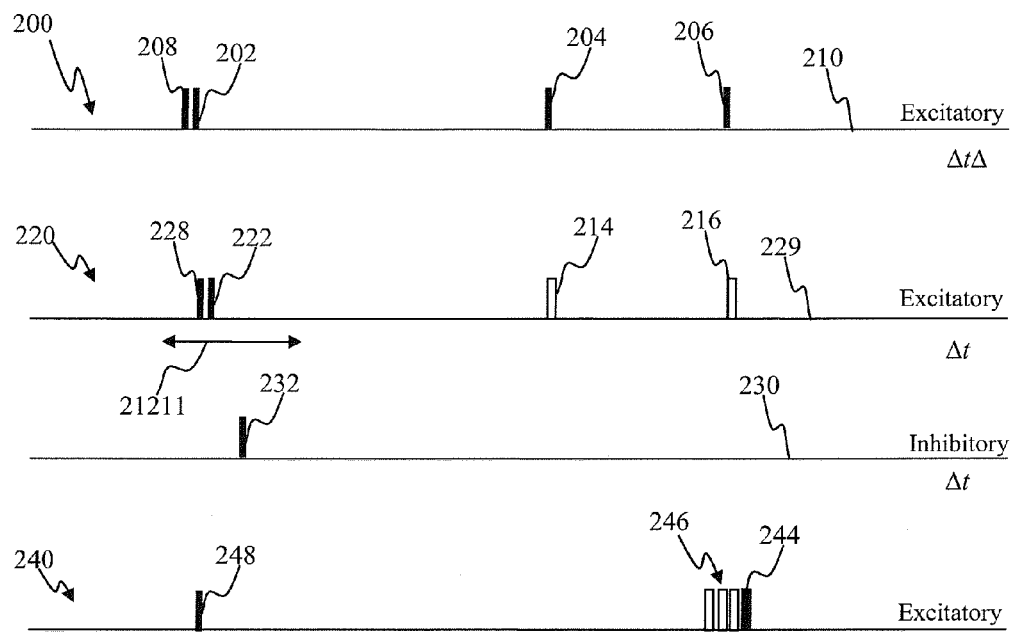
FIG. 2 is a graphical illustration depicting suppression of neuron responding to minor (background) features, in accordance with one implementation of the disclosure.
Figure 2A:
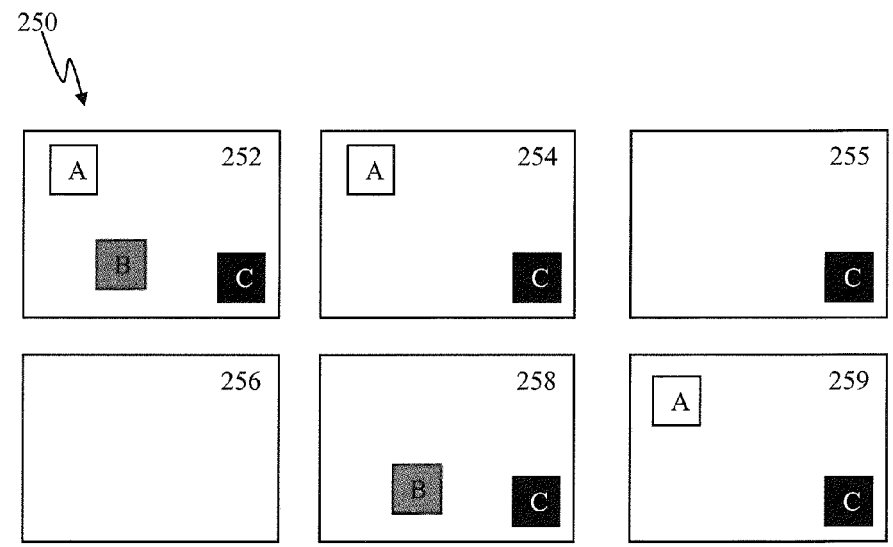
FIG. 2A is a graphical illustration depicting temporally salient feature detection, in accordance with one implementation of the disclosure.

FIG. 2 illustrates a response of a spiking neuron network, comprising the TWTA mechanisms of salient feature detection, in accordance with one or more implementations. The panel 200 of FIG. 2 depicts spikes generated by the units 102 in accordance with one typical mechanism of the prior art. The spikes, indicated by black rectangles denoted 202, 208, 204, 206 on the trace 210, are associated with the units of the groups 112, 118, 114, 116 of FIG. 1A, described above.

The panel 220 of FIG. 2 depicts spikes, indicated by black rectangles, 228, 222 generated by the excitatory units 102 in accordance with one implementation of the TWTA mechanism of the present disclosure. The spikes 222, 288 on the trace 229 are associated with the units of the groups 112, 118 of FIG. 1A, described above. The arrow 212 indicates a latency window that may be used for the early responder (winner) detection mechanism, described with respect to FIG. 1A above. The spike 232 on the trace 226 correspond to the inhibitory indication, such as e.g., that described with respect to FIG. 1A above. Comparing spike trains on the traces 210 and 229, the inhibitory spike 232 may prevent (suppress) generation of spikes 204, 206, as indicated by the blank rectangles 214, 216 on trace 229, at time instances corresponding to the spikes 204, 206 of the trace 210 in FIG. 2.

In some implementations, corresponding to the units generating a burst of spikes, the inhibitory signal (e.g., the spike 232 in FIG. 2) may suppress generation of some spikes within the burst. One such case is illustrated by panel 240 of FIG. 2, where the inhibitory signal may be configured to suppress some of the late fired spikes, while allowing a reduced fraction of the late spikes to be generated. In the implementation of the panel 240 of FIG. 2 (also referred to as the "soft" inhibition), one or more spikes of 246 the spike train are suppressed (as depicted by the blank rectangles) due to the inhibitory signal (e.g., the signal 232). However, one (or more) spikes 244 may persist.

The exemplary implementation of the winner-takes-all (WTA) mechanism illustrated in FIG. 1A may be referred to as a spatially coherent WTA, as the inhibitory signal may originate due to two or more "winner" units responding to a spatially coherent stimulus feature (e.g., the pixel groups 128, 122 in FIG. 1A). In some implementations, the WTA mechanism may be based on a temporally coherent stimulus, such as for example that described with respect to FIG. 2A. The frames 252, 254, 255, 256, 258, 259 shown in FIG. 2A may correspond for instance to a series of frames collected with a video and/or still image recording device (e.g., a camera) and/or a RADAR, or SONAR visualization. The frame series 250 can comprise representations of several features, in this example denoted 'A', 'B', 'C'. The feature C may be considered as the salient feature, as it persists throughout the sequence of frames 252, 254, 255, 258, 259. In some implementations, the salient feature may be missing from one of the frames (e.g., the frame 256 in FIG. 2A) due to, for example, intermittent signal loss, and/or high noise. The features 'A', 'B' may be considered as temporally not salient, as they are missing from several frames (e.g., the frames 254, 255, 258, 259) of the illustrator sequence 250. It is noteworthy, that a temporally non-salient feature of a frame sequence (e.g., the feature 'B' in FIG. 2A) may still be spatially salient when interpreted in the context of a single frame.

The exemplary WTA mechanism described with respect to FIGS. 1A-2A supra, is illustrated using a single aspect of the sensory input (e.g., a spectral illuminance parameter, such as brightness, of plate 120 of FIG. 1A. In some implementations, the WTA mechanism of the disclosure may advantageously combine two or more aspects of sensory input in order to facilitate salient feature detection. In one implementation, illustrated in FIG. 2B, some the sensory input may comprise a pixel array 260 (e.g., a visual, RADAR, and/or SONAR sensor output). The pixel aspects may comprise for instance a visual aspect (e.g., pixel contrast, shown by grayscale rectangles labeled 'A', 'B', 'C' in FIG. 2B). In some implementations, the other pixel aspects may comprise pixel motion (e.g., a position, a rate of displacement, and/or an acceleration) illustrated by arrows denoted 262, 264, 266 in FIG. 2B. The arrow 264 depicts coherent motion of object 'C', such as for example motion of a solid object, e.g., a car. The arrow groups 262, 264 depict in-coherent motion of the pixel groups, associated with the features 'A', 'B', such as for example clutter, false echoes, and/or birds.

Figure 2B:
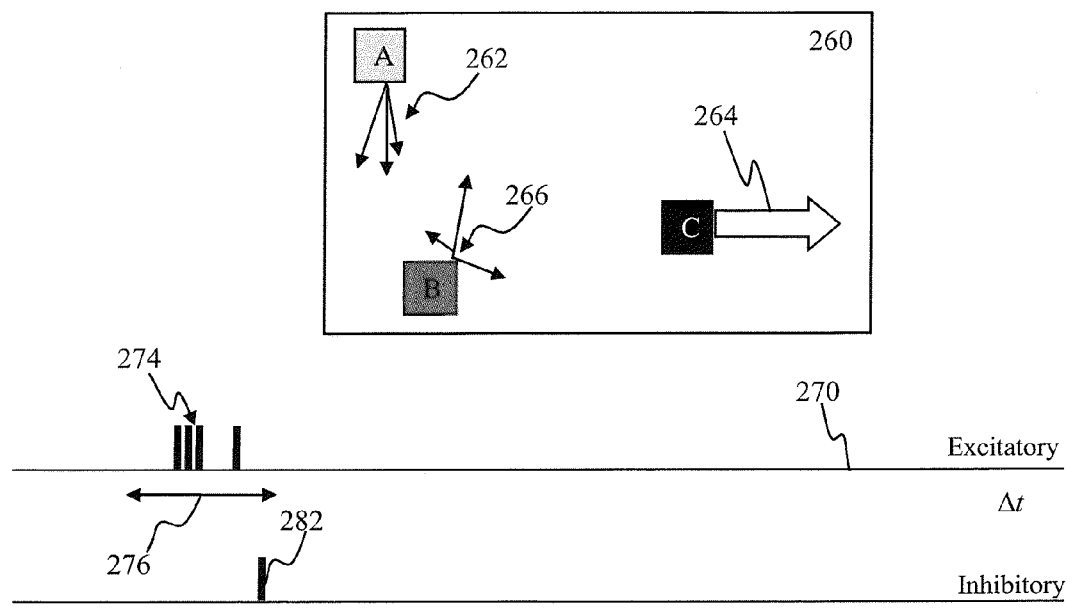
FIG. 2B is a graphical illustration depicting detection of spatially salient feature detection aided by encoding of multiple aspects of sensory stimulus, in accordance with one implementation of the disclosure.

In some implementations, spiking neuron network may be used to encode two (or more) aspects (e.g., color and brightness) of the input into spike output, illustrated by the trace 270 of FIG. 2B. The pulse train 274 may comprise two or more pulses 274 associated with the one or more aspects of the pixel array 260. Temporal proximity of the pulses 274, associated for example with the high contrast and coherent motion of the salient feature 'C', may cause an inhibitory spike 282. In some implementations, the inhibitory indication may prevent the network from generating a response to less noticeable features (e.g., the features 'A', 'B' in FIG. 2B). In one or more implementations (not shown), a spiking neuron network may be used to encode two (or more) modalities (visual and audio) of the input into a spike output.

Exemplary Methods
Salient Feature Detection

Figure 4:
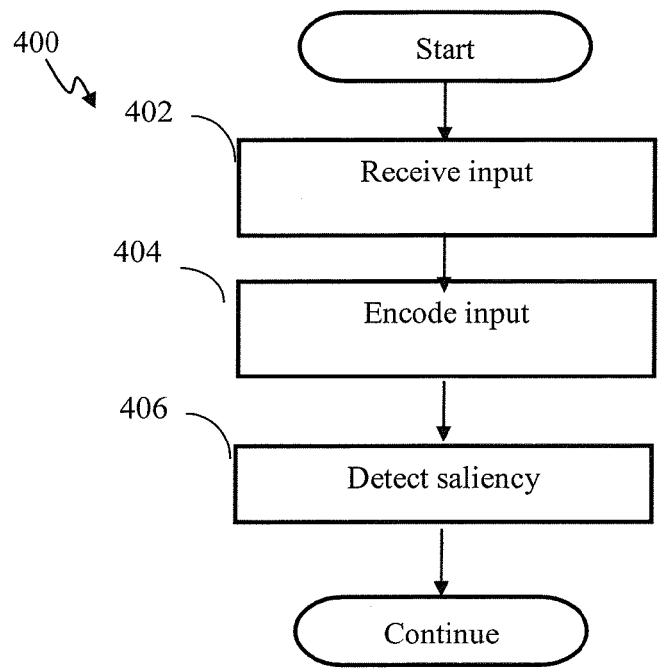
FIG. 4 is a logical flow diagram illustrating a generalized method of detecting salient features, in accordance with one implementation of the disclosure.

Referring now to FIG. 4, an exemplary method of salient feature detection in sensory input in accordance with one or more implementations is shown and described.

At step 402 of the method 400 of FIG. 4, input may be received by sensory processing apparatus (e.g., the apparatus 1000 shown and described with respect to FIG. 10A, below). In one or more implementations, the sensory input may comprise visual input, such as for example, ambient light 1062 received by a lens 1064 in a visual capturing device 1160 (e.g., telescope, motion or still camera, microscope, portable video recording device, smartphone), illustrated in FIG. 10B below. The visual input received at step 402 of method 400 may comprise for instance an output of an imaging CCD or CMOS/APS array of the device 1080 of FIG. 10B. In one or more implementations, such as, for example, processing apparatus 1070 configured for processing of digitized images in e.g., portable video recording and communications device) described with respect to FIG. 10B, below, the visual input of FIG. 4 may comprise digitized frame pixel values (RGB, CMYK, grayscale) refreshed at a suitable rate. The visual stimulus may correspond to an object (e.g., a bar that may be darker or brighter relative to background), or a feature being present in the field of view associated with the image generation device. The sensory input may alternatively comprise other sensory modalities, such as somatosensory and/or olfactory, or yet other types of inputs as will be recognized by those of ordinary skill given the present disclosure.

At step 404, the sensory input is encoded using for example latency encoding mechanism described supra.

At step 406, sensory input saliency is detected. In one or more implementations of visual input processing, saliency detection may comprise detecting features and/or objects that are brighter and/or darker compared to a background brightness and/or average brightness. Saliency detection may comprise for instance detecting features and/or objects that have a particular spectral illuminance characteristic (e.g., color, polarization) or texture, compared of an image background and/or image average.

Figure 4A:
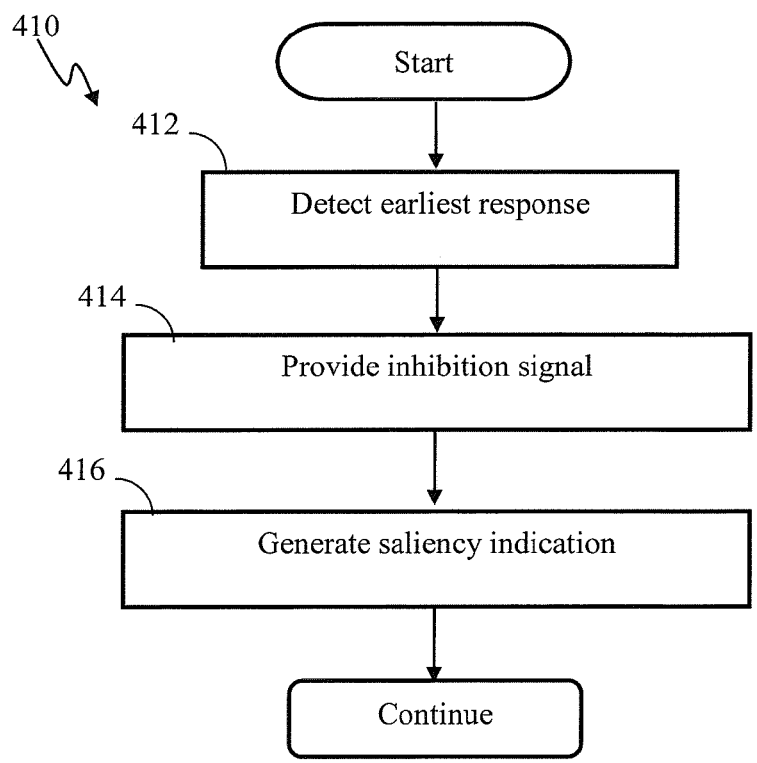
FIG. 4A is a logical flow diagram illustrating a method of detecting salient features based on an inhibition of late responding units, in accordance with one implementation of the disclosure.

FIG. 4A illustrates an exemplary method of detecting salient features based on an inhibition of late responding units for use, for example, with the method 400 of FIG. 4. In one or more implementations, the method is effectuated in a spiking neuron network, such as, for example the network 140 of FIG. 1A, and/or network 1025 of FIG. 10A, described below, although other types of networks may be used with equal success.

At step 412 of method 410 of FIG. 4A, an initial response of neuron network units is detected. In one or more implementations, the detection may comprise a latency parameter, such as the latency window 212 described with respect to FIG. 2 supra.

At step 414 of method 410, an inhibition signal is generated. The inhibition signal may be based, at least partly, on the initial response detection of step 412. In one or more implementations, the inhibition signal may be generated by an inhibitory neuron configured to receive post-synaptic feed-forward responses from one or more units, such as, for example the inhibitory neuron 1040, receiving output (e.g., post-synaptic responses) from units 1022 of FIG. 10A.

In one or more implementations, the inhibition signal may cause reduction and/or absence of subsequent post-synaptic responses by the remaining units within the network, thereby enabling the network to provide saliency indication at step 416. In some implementations, the saliency indication may comprise a frame number (and/or (x,y) position within the frame) of an object and/or feature associated with the spikes that made it through the WTA network. The saliency indication may be used, for example, to select frames comprising the salient object/feature and/or shift (e.g., center) lens field of view in order to afford a fuller coverage of the object/feature by the lens field of view.

Figure 5:
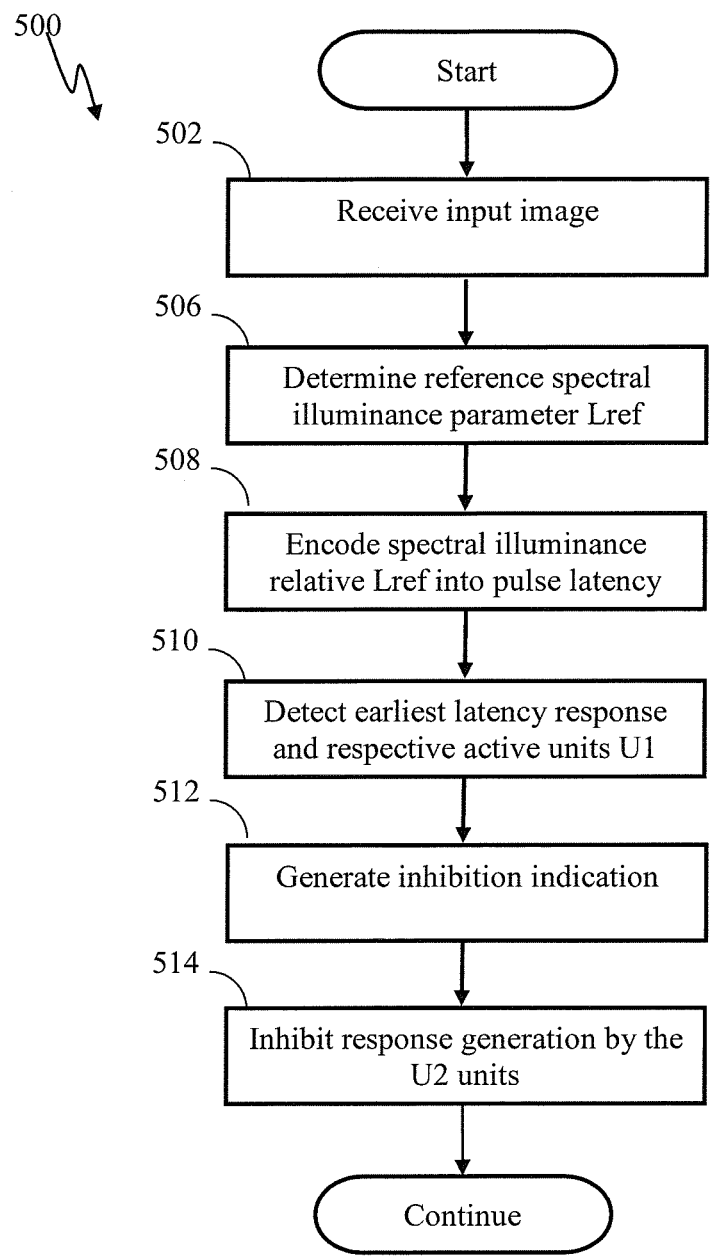
FIG. 5 is a logical flow diagram illustrating a method of detecting salient features in visual input using latency based encoding, in accordance with one implementation of the disclosure.

FIG. 5 illustrates one exemplary method of detecting salient features in visual input using latency based encoding, in accordance with one or more implementations.

At step 502 of the method 500 of FIG. 5, an input image is received. In some implementations, the image may comprise output of imaging CMOS/APS array of a video capturing device (e.g., the device 1080 of FIG. 10B). In one or more implementations, such as, for example, processing apparatus 1070 configured for processing of digitized images in e.g., portable video recording and communications device)

described with respect to FIG. 10B, below, the input image may comprise digitized frames of pixel values (RGB, CMYK, grayscale) refreshed at suitable rate.

At step 506, a reference parameter (e.g., spectral illuminance parameter $L_{ref}$) of the image may be determined. In one or more implementations, the parameter $L_{ref}$ may comprise image average and/or image background brightness, or dominant and/or image background color.

At step 508, the image is encoded. The encoding may comprise for example encoding image brightness difference to the reference brightness $L_{ref}$ into pulse latency. In some implementations, the latency encoding may be effectuated for example using Eqn. 1 herein, although other approaches may be used as well.

At step 510, the earliest responses of one or more network units U1 may be detected. In one or more implementations, the detection may comprise a latency parameter, such as the latency window 212 described with respect to FIG. 2 supra.

At step 512, an inhibition signal is generated. In one or more implementations, the inhibition signal may be based, at least partly, on the initial response detection of step 510. The earliest latency response detection may be provided to a designated inhibitory network unit, such as, for example the unit 1040 in FIG. 10A. The earliest latency response detection may also comprise post-synaptic feed-forward response generated by the neuronal units responsive to feed-forward sensory stimulus. In one such implementation, the inhibition signal may be generated by the inhibitory neuron configured to receive post-synaptic feed-forward responses from one or more units, such as, for example the inhibitory neuron 1040, receiving output (e.g., post-synaptic responses) from units 1022 of FIG. 10A. In some implementations, the inhibition indication may be generated internally by the network units based on information related to prior activity of other units (e.g., the earliest latency response detection indication).

At step 514, responses of the remaining population of the network units (i.e., the units whose responses have not been detected at step 510) are inhibited, i.e. prevented from responding.

Network Unit Operation

Figure 6:
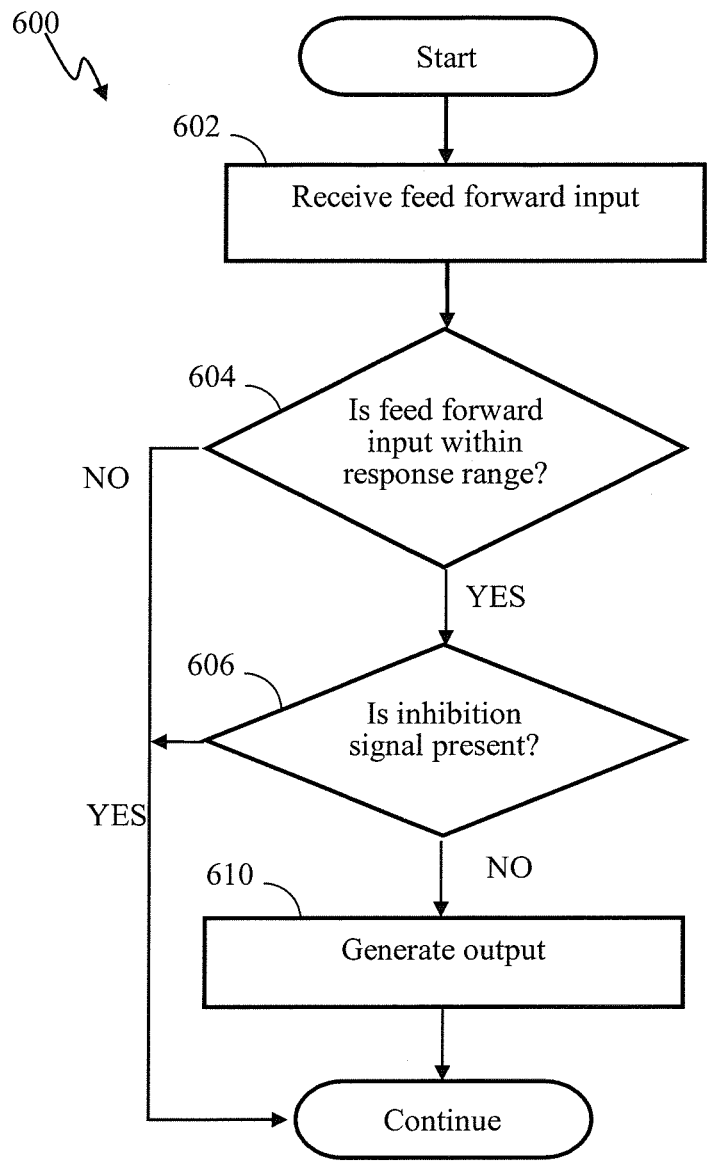
FIG. 6 is a logical flow diagram illustrating a method of operating a spiking network unit for use with salient feature detection method of FIG. 4A, in accordance with one implementation of the disclosure.

FIG. 6 is a logical flow diagram illustrating a method of operating a spiking network unit (e.g., the unit 1022 of FIG. 10A) for use with the salient feature detection method of FIG. 4A, in accordance with one or more implementations.

At step 602, a feed-forward input is received by the unit. In some implementations, the feed-forward input may comprise sensory stimulus 1002 of FIG. 10A.

At step 604, the state of the unit may be evaluated in order to determine if the feed-forward input is sufficient (i.e., is within the unit input range) to cause post-synaptic response by the unit. In some implementations, the feed forward input may comprise a pattern of spikes and the unit post-synaptic response may be configured based on detecting the pattern within the feed-forward input.

If the feed-forward input is sufficient to cause post-synaptic response by the unit, the method proceeds to step 606, where a determination may be performed whether the inhibition signal is present. If the inhibition signal is not present, the unit may generate an output (a post-synaptic response) at step 610.

In one or more implementations, the unit may be operable in accordance with a dynamic and/or a stochastic unit process. In one such implementation, the operations of steps 604, 606 may be combined. Accordingly, the unit response generation may be based on evaluation of neuronal state, as described, for example in co-pending and co-owned U.S. patent application Ser. No. 13/465,924, entitled "SPIKING NEURAL NETWORK FEEDBACK APPARATUS AND METHODS", filed May 7, 2012, co-pending and co-owned U.S. patent application Ser. No. 13/540,429 entitled "SENSORY PROCESSING APPARATUS AND METHODS", filed Jul. 2, 2012, U.S. patent application Ser. No. 13/488,106, entitled "SPIKING NEURON NETWORK APPARATUS AND METHODS", filed Jun. 4, 2012, and U.S. patent application Ser. No. 13/488,114, entitled "LEARNING APPARATUS AND METHODS USING PROBABILISTIC SPIKING NEURONS", filed Jun. 4, 2012, each of the foregoing incorporated supra.

Image Processing

Figure 7:
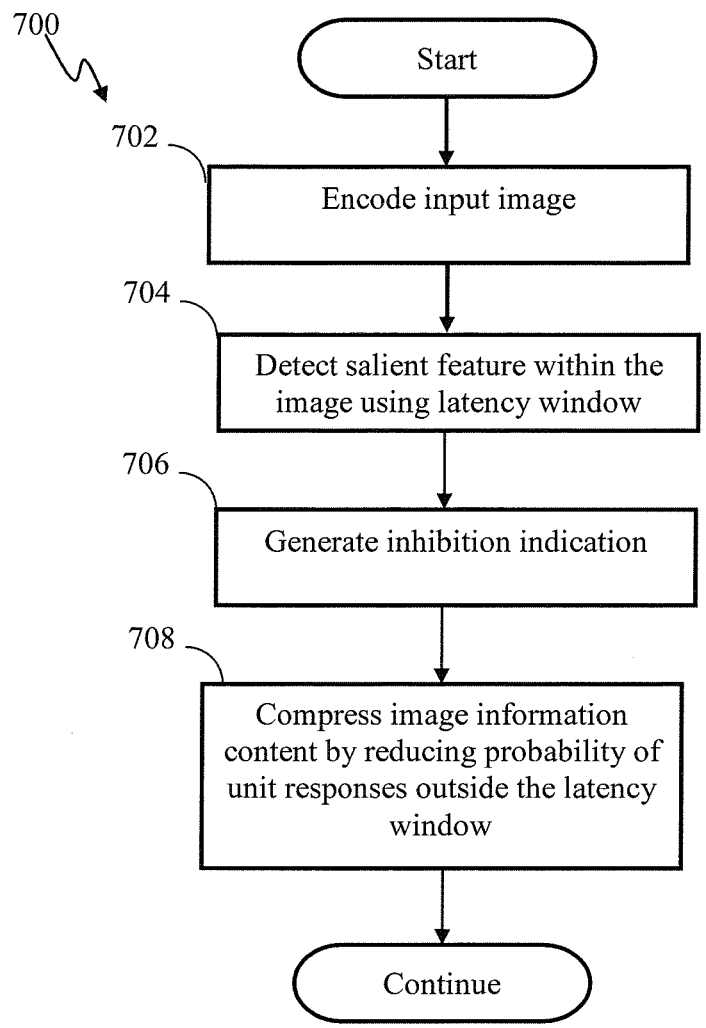
FIG. 7 is a logical flow diagram illustrating a method of image compression using salient feature detection, in accordance with one implementation of the disclosure.
Figure 8:
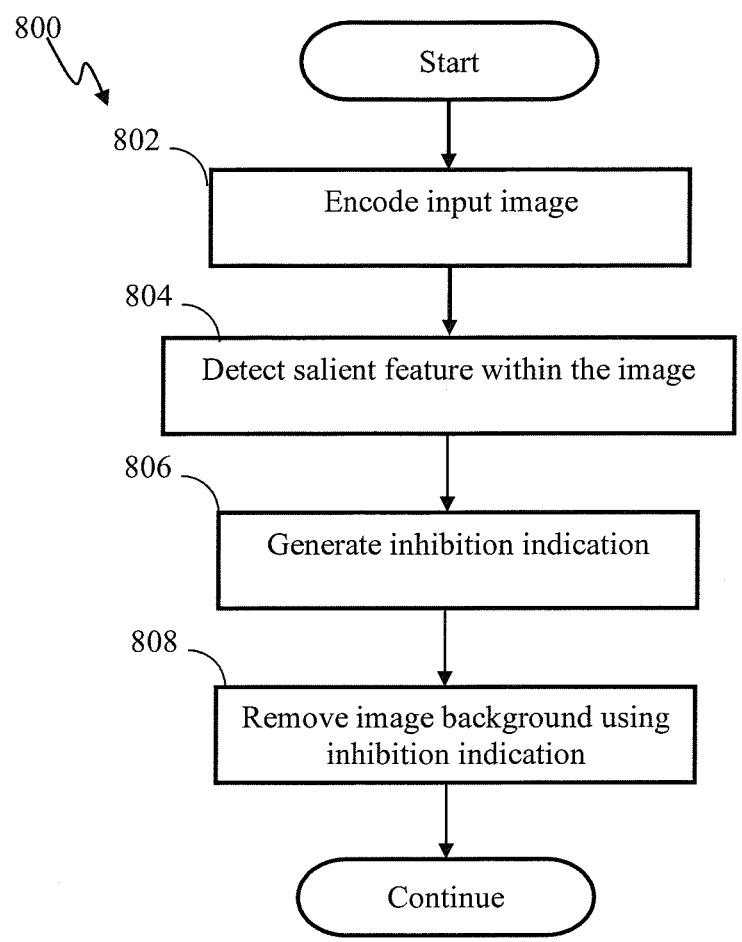
FIG. 8 is a logical flow diagram illustrating a method of detecting salient features based on an inhibition of late responding neurons, in accordance with one implementation of the disclosure.

FIGS. 7-8 illustrate exemplary methods of visual data processing comprising the salient feature detection functionality of various aspects of the invention. In one or more implementations, the processing steps of methods 700, 800 of FIGS. 7-8, respectively, may be effectuated by the processing apparatus 1000 of FIG. 10A, described in detail below, e.g., by a spiking neuron network such as, for example, the network 1025 of FIG. 10A, described in detail below.

At step 702 of method 700 of FIG. 7 (illustrating exemplary method of image compression), in accordance with one or more implementations, the input image may be encoded using, for example, latency encoding described supra. The salient feature detection may be based for instance at least in part on a latency window (e.g., the window 212 of FIG. 2 above).

At step 704, one or more salient features (that may be present within the image) are detected. In some implementations, the salient feature detection may comprise the method of FIG. 4A, described above.

At step 706 of method 700, an inhibition indication is generated. In one or more implementations, the inhibition signal may be based, at least partly, on the initial response detection of step 704. The inhibition signal may be generated for instance by an inhibitory neuron configured to receive post-synaptic feed-forward responses from one or more units, such as, for example the inhibitory neuron 1040, receiving output (e.g., post-synaptic responses) from units 1022 of FIG. 10A.

At step 708, the inhibition indication is used to reduce a probability of unit response(s) that are outside the latency window. The window latency is configured for example based on maximum relevant latency. In some implementations, the maximum relevant latency may correspond to minimum contrast, and/or minimum brightness within the image. Inhibition of unit responses invariably reduces the number of spikes that are generated by the network in response to the stimulus input image. Accordingly, the spike number reduction may effectuate image compression. In some implementations, the compressed image may comprise the initial unit responses (i.e., the responses used at step 704 of method 700) that fall within the latency window. The compressed image may be reconstructed using e.g., random and/or preset filler in information (e.g., background of a certain color and/or brightness) in combination with the salient features within the image.

FIG. 8 illustrates an exemplary method of image background removal using the salient feature detection methodology described herein.

At step 802 of method 800, the input image is encoded using, for example, latency encoding described supra. In one or more implementations, the salient feature detection is based at least in part on a latency window (e.g., the window 212 of FIG. 2 above).

At step 804, one or more salient features (that may be present within the image) are detected, such as via the method of FIG. 4A, described above.

At step 806 of method 800, an inhibition indication is generated. In one or more implementations, the inhibition signal may be based, at least partly, on the initial response detection of step 704, and generated by an inhibitory neuron configured to receive post-synaptic feed-forward responses from one or more units, such as, for example the inhibitory neuron 1040, receiving output (e.g., post-synaptic responses) from units 1022 of FIG. 10A.

At step 808, the inhibition indication is used to reduce a probability of unit responses that are outside the latency window. The window latency is configured based on e.g., maximum relevant latency. In some implementations, the maximum relevant latency may correspond to minimum contrast, and/or minimum brightness within the image. Inhibition of unit responses may eliminate unit output(s) (i.e., the spikes) that may be generated by the network in response to the stimulus of the input image that corresponds to the image background. Accordingly, the network output may comprise spikes associated with salient features within the image and not with the image background. In some implementations, the original image may be reconstructed using arbitrary and/or pre-determined background (e.g., background of a certain color and/or brightness) in combination with the salient features within the processed image.

The background removal may advantageously be used for removal of noise (i.e., portions of the image that are not pertinent to the feature being detected). The noise removal may produce an increase in signal to noise ratio (SNR), thereby enabling improved detection of salient features within the image.

Exemplary Processing Apparatus

Various exemplary spiking network apparatus comprising the saliency detection mechanism of the disclosure are described below with respect to FIGS. 10A-11C.

Spiking Network Sensory Processing Apparatus

One apparatus for processing of visual information using salient feature detection as described above is illustrated in FIG. 10A. In one or more implementations, the apparatus 1000 comprises an encoder 1010 that may be configured to receive input signal 1002. In some applications, such as, for example, artificial retinal prosthetic, the input 1002 may be a visual input, and the encoder 1010 may comprise one or more diffusively coupled photoreceptive layer as described in U.S. patent application Ser. No. 13/540,429, entitled "SENSORY PROCESSING APPARATUS AND METHODS", incorporated supra. The visual input may comprise for instance ambient visual light captured through, inter alia, an eye lens. In some implementations, such as for example encoding of light gathered by a lens 1064 in visual capturing device 1060 (e.g., telescope, motion or still camera) illustrated in FIG. 10B, the visual input comprises ambient light stimulus 1062 captured by, inter alia, device lens 1064. In one or more implementations, such as, for example, an encoder 1076 configured for processing of digitized images a processing apparatus 1070 described with respect to FIG. 10B below, the sensory input 1002 of FIG. 10A comprises digitized frame pixel values (RGB, CMYK, grayscale) refreshed at suitable rate, or other sensory modalities (e.g., somatosensory and/or gustatory).

Figure 10A:
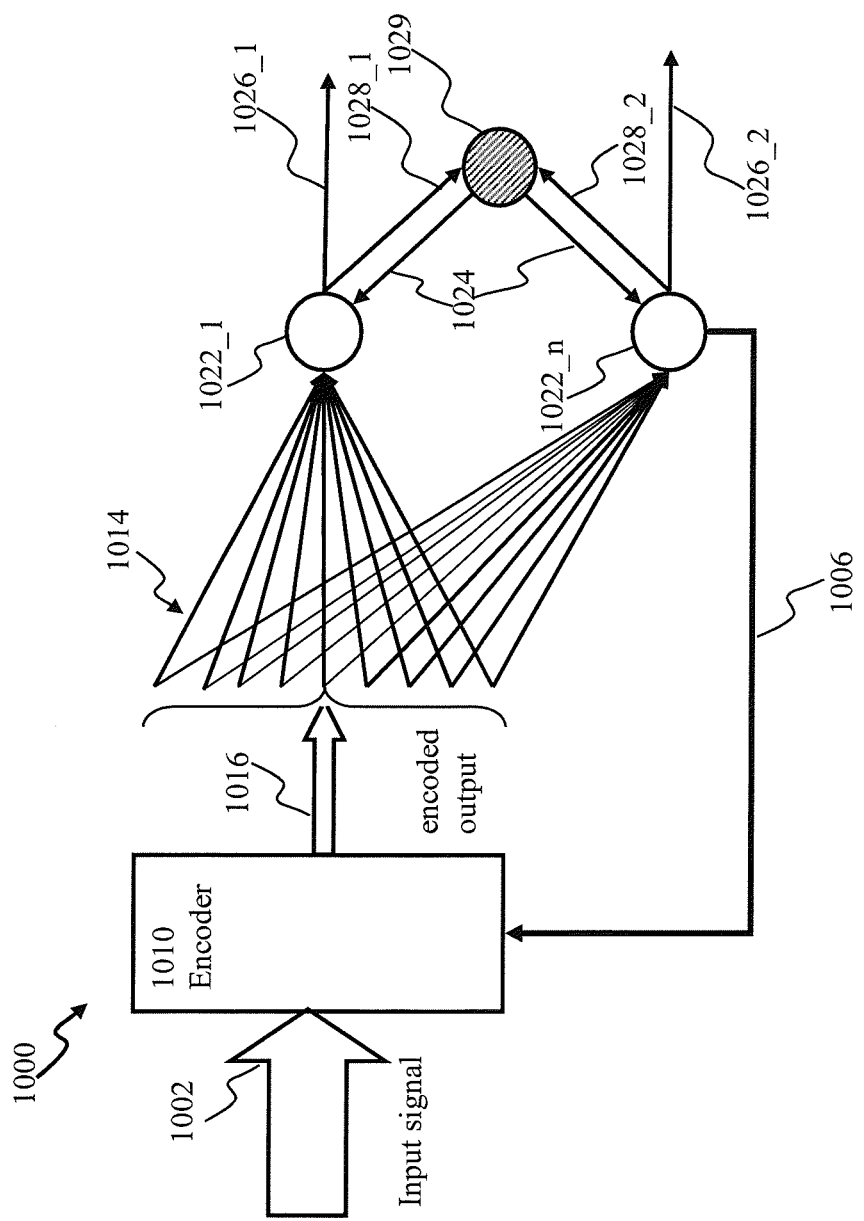
FIG. 10A is a block diagram illustrating a visual processing apparatus comprising salient feature detector apparatus configured in accordance with one or more implementations.
Figure 10B:
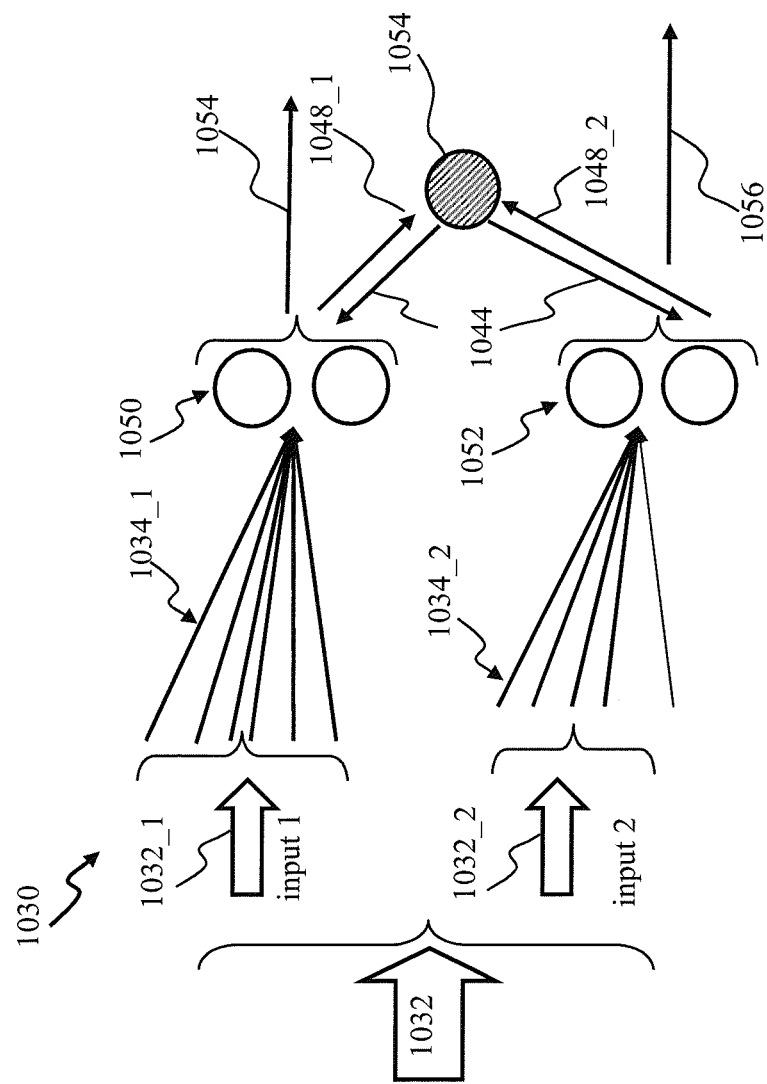
FIG. 10B is a block diagram illustrating a visual processing apparatus comprising encoding of two sensory input attributes configured to facilitate salient feature detection, in accordance with one or more implementations of the disclosure.
Figure 10C:
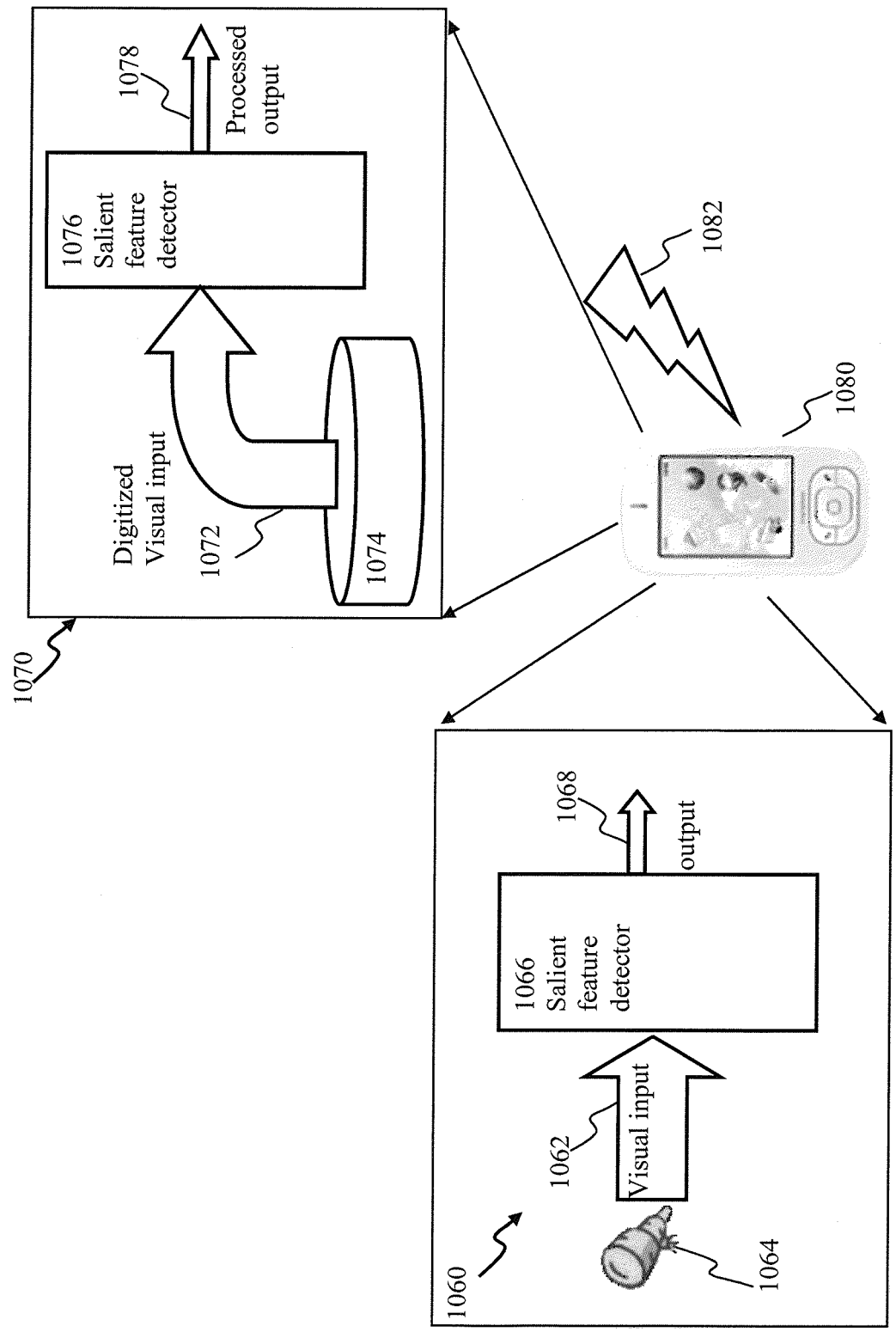
FIG. 10C is a block diagram illustrating an encoder apparatus (such as for instance that of FIG. 10A) configured for use in an image processing device adapted to process (i) visual signal; and/or (ii) processing of digitized image, in accordance with one or more implementations of the disclosure.

The input may comprise light gathered by a lens of a portable video communication device, such as the device 1080 shown in FIG. 10B. In one implementation, the portable device may comprise a smartphone configured to process still and/or video images using diffusively coupled photoreceptive layer described in the resent disclosure. The processing may comprise for instance image encoding and/or image compression, using for example processing neuron layer. In some implementations, encoding and/or compression of the image may be utilized to aid communication of video data via remote link (e.g., cellular, Bluetooth, WiFi, LTE, etc.), thereby reducing bandwidth demands on the link.

In some implementations, the input may comprise light gathered by a lens of an autonomous robotic device (e.g., a rover, an autonomous unmanned vehicle, etc.), which may include for example a camera configured to process still and/or video images using, inter alia, one or more diffusively coupled photoreceptive layers described in the aforementioned referenced disclosure. In some implementations, the processing may comprise image encoding and/or image compression, using for example processing neuron layer. For instance, higher responsiveness of the diffusively coupled photoreceptive layer may advantageously be utilized in rover navigation and/or obstacle avoidance.

It will be appreciated by those skilled in the art that the apparatus 1000 may be also used to process inputs of various electromagnetic wavelengths, such as for example, visible, infrared, ultraviolet light, and/or combination thereof. Furthermore, the salient feature detection methodology of the disclosure may be equally useful for encoding radio frequency (RF), magnetic, electric, or sound wave information.

Returning now to FIG. 10A, the input 1002 may be encoded by the encoder 1010 using, inter alia, spike latency encoding mechanism described by Eqn. 1.

In one implementation, such as illustrated in FIG. 10A, the apparatus 1000 may comprise a neural spiking network 1025 configured to detect an object and/or object features using, for example, context aided object recognition methodology described in U.S. patent application Ser. No. 13/488,114, filed Jun. 4, 2012, entitled "SPIKING NEURAL NETWORK OBJECT RECOGNITION APPARATUS AND METHODS", incorporated herein by reference in its entirety. In one such implementation, the encoded signal 1012 may comprise a plurality of pulses (also referred to as a group of pulses), transmitted from the encoder 1010 via multiple connections (also referred to as transmission channels, communication channels, or synaptic connections) 1014 to one or more neuron units (also referred to as the detectors) 1022 of the spiking network apparatus 1025. Although only two detectors (1022_1, 1022_n) are shown in the implementation of FIG. 10A for clarity, it is appreciated that the encoder 1010 may be coupled to any number of detector nodes that may be compatible with the apparatus 1000 hardware and software limitations. Furthermore, a single detector node may be coupled to any practical number of encoders.

In one implementation, the detectors 1022_1, 1022_n may contain logic (which may be implemented as a software code, hardware logic, or a combination of thereof) configured to recognize a predetermined pattern of pulses in the signal 1012, using any of the mechanisms described, for example, in the U.S. patent application Ser. No. 12/869,573, filed Aug. 26, 2010 and entitled "SYSTEMS AND METHODS FOR INVARIANT PULSE LATENCY CODING", U.S. patent application Ser. No. 12/869,583, filed Aug. 26, 2010, entitled "INVARIANT PULSE LATENCY CODING SYSTEMS AND METHODS", U.S. patent application Ser. No. 13/117,048, filed May 26, 2011 and entitled "APPARATUS AND METHODS FOR POLYCHRONOUS ENCODING AND MULTIPLEXING IN NEURONAL PROSTHETIC DEVICES", U.S. patent application Ser. No. 13/152,084, filed Jun. 2, 2011, entitled "APPARATUS AND METHODS FOR PULSE-CODE INVARIANT OBJECT RECOGNITION", to produce post-synaptic detection signals transmitted over communication channels 1026.

In one implementation, the detection signals may be delivered to a next layer of the detectors (not shown) for recognition of complex object features and objects, similar to the description found in commonly owned U.S. patent application Ser. No. 13/152,119, filed Jun. 2, 2011, entitled "SENSORY INPUT PROCESSING APPARATUS AND METHODS". In this implementation, each subsequent layer of detectors may be configured to receive signals from the previous detector layer, and to detect more complex features and objects (as compared to the features detected by the preceding detector layer). For example, a bank of edge detectors may be followed by a bank of bar detectors, followed by a bank of corner detectors and so on, thereby enabling alphabet recognition by the apparatus.

The output of the detectors 1022 may also be provided to one or more inhibitory units 1029 via feed-forward connections 1028. The inhibitory unit 1029 may contain logic (which may be implemented as a software code, hardware logic, or a combination of thereof) configured to detect the first responders among the detectors 1022. In one or more implementations, the detection of the first-to respond detectors is effectuated using a latency window (e.g., the window 212 in FIG. 2). In some cases (for example when processing digital image frames), the onset of the latency window may be referenced to the onset of the input frame. The latency window may also be referenced to a lock and/or an event (e.g., a sync strobe). In one or more implementations, the window latency may be configured based on maximum relevant latency. The maximum relevant latency may correspond for example to minimum contrast, and/or minimum brightness within the image. Inhibition of unit responses may eliminate unit output (i.e., the spikes) that are may be generated by the network in response to the stimulus of the input image that corresponds to the image background. The first to respond units may correspond for example to the units 102 of the unit group 112 of FIG. 1 responding to a salient feature within the input 1002.

The inhibitory units may also provide inhibitory indications to the detectors 1022 via the feedback connections 1054. The inhibition indication may be based, at least partly, on e.g., the detection of the first-to-respond unit(s) and characterized by the response time $t_{sal}$. In one or more implementations, the inhibition indication may cause a reduction of probability of responses being generated by the units 1022, subsequent to the response time $t_{sal}$. Accordingly, the network output 1026 may comprise spikes associated with salient features within the image. In some implementations, the output 1026 may not contain spikes associated with image background and/or other not salient features, thereby effectuating image compression and/or background removal. The original image may also be reconstructed from the compressed output using for example arbitrary and/or pre-determined background (e.g., background of a certain color and/or brightness) in combination with the salient features within the processed image.

The sensory processing apparatus implementation illustrated in FIG. 10A may further comprise feedback connections 1006. In some variants, connections 1006 may be configured to communicate context information as described in detail in U.S. patent application Ser. No. 13/465,924, entitled "SPIKING NEURAL NETWORK FEEDBACK APPARATUS AND METHODS", filed May 7, 2012, incorporated supra.

In some implementations, the network 1025 may be configured to implement the encoder 1010.

Visual Processing Apparatus

FIG. 10B, illustrates some exemplary implementations of the spiking network processing apparatus 1000 of FIG. 10A useful for visual encoding application. The visual processing apparatus 1060 may comprise a salient feature detector 1066, adapted for use with ambient visual input 1062. The detector 1066 of the processing apparatus 1060 may be disposed behind a light gathering block 1064 and receive ambient light stimulus 1062. In some implementations, the light gathering block 1064 may comprise a telescope, motion or still camera, microscope. Accordingly, the visual input 1062 may comprise ambient light captured by, inter alia, a lens. In some implementations, the light gathering block 1064 may an imager apparatus (e.g., CCD, or an active-pixel sensor array) so may generate a stream of pixel values.

In one or more implementations, the visual processing apparatus 1070 may be configured for digitized visual input processing. The visual processing apparatus 1070 may comprise a salient feature detector 1076, adapted for use with digitized visual input 1072. The visual input 1072 of FIG. 10C may comprise for example digitized frame pixel values (RGB, CMYK, grayscale) that may be refreshed from a digital storage device 1074 at a suitable rate.

The encoder apparatus 1066, 1076 may comprise for example the spiking neuron network, configured to detect salient features within the visual input in accordance with any of the methodologies described supra.

In one or more implementations, the visual capturing device 1160 and/or processing apparatus 1070 may be embodied in a portable visual communications device 1080, such as smartphone, digital camera, security camera, and/or digital video recorder apparatus. In some implementations the salient feature detection of the present disclosure may be used to compress visual input (e.g., 1062, 1072 in FIG. 10C) in order to reduce bandwidth that may be utilized for transmitting processed output (e.g., the output 1068, 1078 in FIG. 10C) by the apparatus 1080 via a wireless communications link 1082 in FIG. 10C.

Computerized Neuromorphic System

Figure 11A:
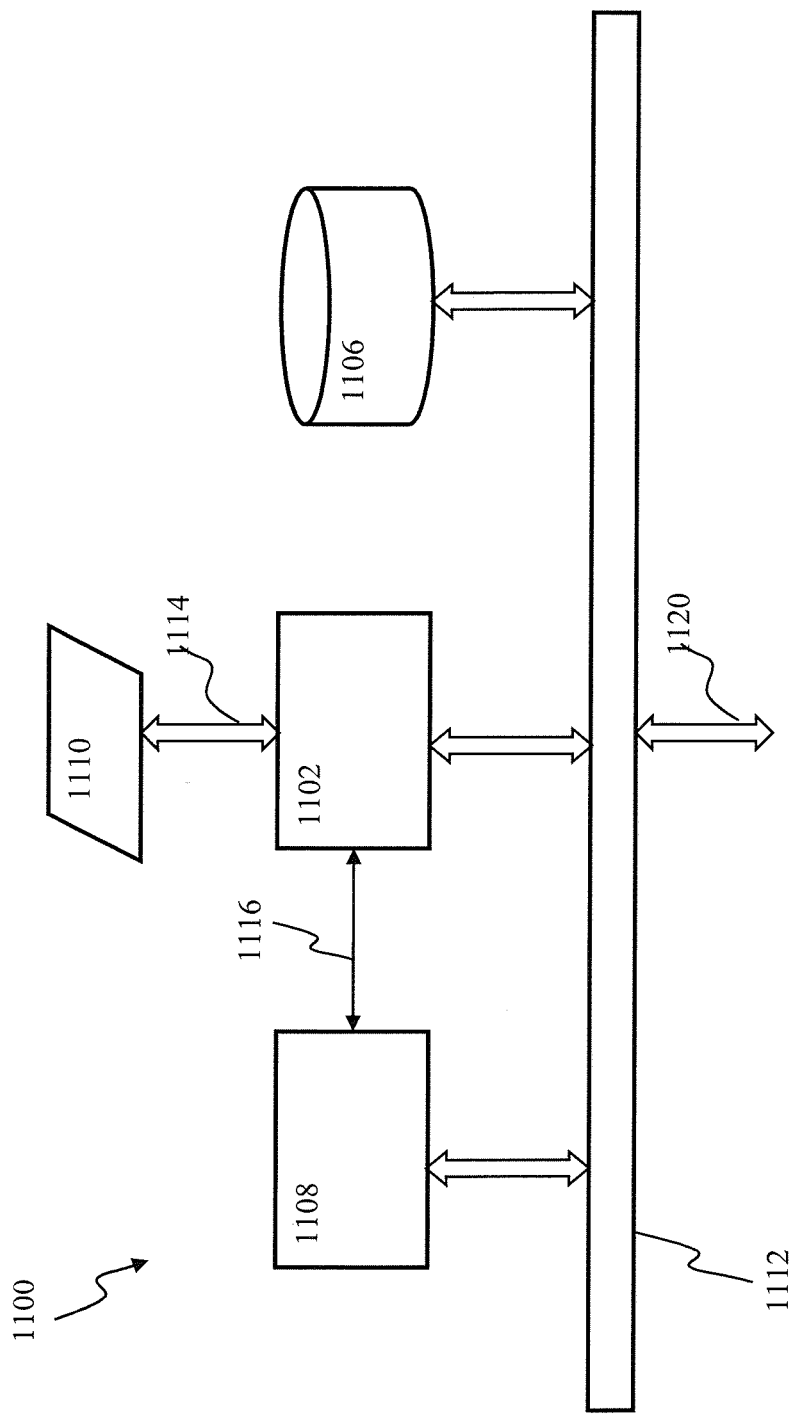
FIG. 11A is a block diagram illustrating a computerized system useful with salient feature detection mechanism in accordance with one implementation of the disclosure.

One particular implementation of the computerized neuromorphic processing system, for use with salient feature detection apparatus described supra, is illustrated in FIG. 11A. The computerized system 1100 of FIG. 11A may comprise an input device 1110, such as, for example, an image sensor and/or digital image interface. The input interface 1110 may be coupled to the processing block (e.g., a single or multi-processor block) via the input communication interface 1114. In some implementations, the interface 1114 may comprise a wireless interface (cellular wireless, Wi-Fi, Bluetooth, etc.) that enables data transfer to the processor 1102 from remote I/O interface 1100, e.g. One such implementation may comprise a central processing apparatus coupled to one or more remote camera devices comprising salient feature detection apparatus of the disclosure.

The system 1100 further may comprise a random access memory (RAM) 1108, configured to store neuronal states and connection parameters and to facilitate synaptic updates. In some implementations, synaptic updates are performed according to the description provided in, for example, in U.S. patent application Ser. No. 13/239,255 filed Sep. 21, 2011, entitled "APPARATUS AND METHODS FOR SYNAPTIC UPDATE IN A PULSE-CODED NETWORK", incorporated by reference supra In some implementations, the memory 1108 may be coupled to the processor 1102 via a direct connection (memory bus) 1116, and/or via a high-speed processor bus 1112). In some implementations, the memory 1108 may be embodied within the processor block 1102.

The system 1100 may further comprise a nonvolatile storage device 1106, comprising, inter alia, computer readable instructions configured to implement various aspects of spiking neuronal network operation (e.g., sensory input encoding, connection plasticity, operation model of neurons, etc.). in one or more implementations, the nonvolatile storage 1106 may be used to store state information of the neurons and connections when, for example, saving/loading network state snapshot, or implementing context switching (e.g., saving current network configuration (comprising, inter alia, connection weights and update rules, neuronal states and learning rules, etc.) for later use and loading previously stored network configuration.

In some implementations, the computerized apparatus 1100 may be coupled to one or more external processing/storage/input devices via an I/O interface 1120, such as a computer I/O bus (PCI-E), wired (e.g., Ethernet) or wireless (e.g., Wi-Fi) network connection.

It will be appreciated by those skilled in the arts that various processing devices may be used with computerized system 1100, including but not limited to, a single core/multicore CPU, DSP, FPGA, GPU, ASIC, combinations thereof, and/or other processors. Various user input/output interfaces are similarly applicable to embodiments of the invention including, for example, an LCD/LED monitor, touch-screen input and display device, speech input device, stylus, light pen, trackball, end the likes.

Figure 11B:
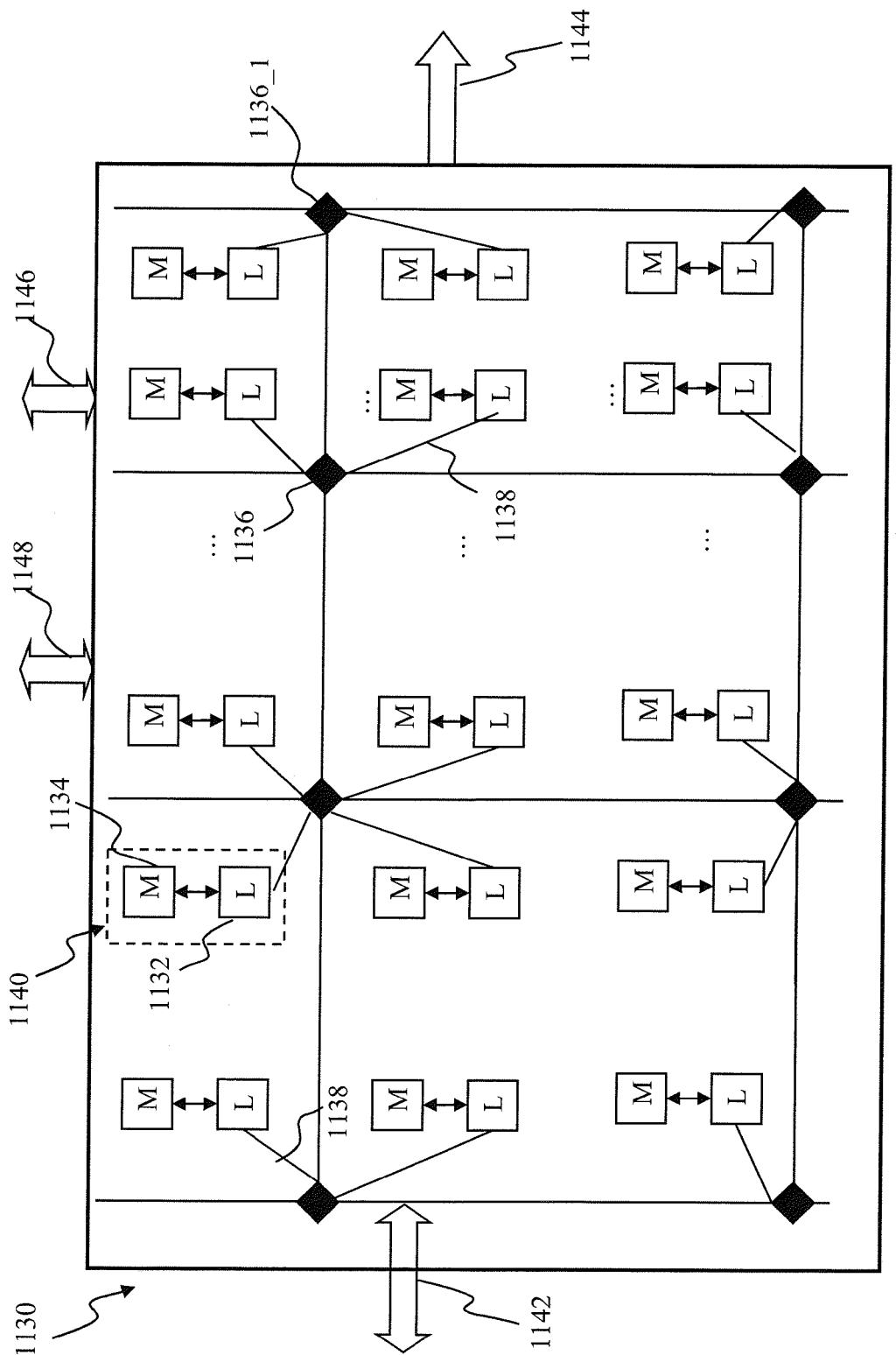
FIG. 11B is a block diagram illustrating a neuromorphic computerized system useful with useful with salient feature detection mechanism in accordance with one or more implementations.

FIG. 11B, illustrates one implementation of neuromorphic computerized system configured for use with salient feature detection apparatus described supra. The neuromorphic processing system 1130 of FIG. 11B may comprise a plurality of processing blocks (micro-blocks) 1140, where each micro core may comprise logic block 1132 and memory block 1134, denoted by 'L' and 'M' rectangles, respectively, in FIG. 11B. The logic block 1132 may be configured to implement various aspects of salient feature detection, such as the latency encoding of Eqn. 1, neuron unit dynamic model, detector nodes 1022 if FIG. 10A, and/or inhibitory nodes 1029 of FIG. 10A. The logic block may implement connection updates (e.g., the connections 1014, 1026 in FIG. 10A) and/or other tasks relevant to network operation. In some implementations, the update rules may comprise rules spike time dependent plasticity (STDP) updates. The memory block 1024 may be configured to store, inter alia, neuronal state variables and connection parameters (e.g., weights, delays, I/O mapping) of connections 1138.

One or more micro-blocks 1140 may be interconnected via connections 1138 and routers 1136. In one or more implementations (not shown), the router 1136 may be embodied within the micro-block 1140. As it is appreciated by those skilled in the arts, the connection layout in FIG. 11B is exemplary and many other connection implementations (e.g., one to all, all to all, etc.) are compatible with the disclosure.

The neuromorphic apparatus 1130 is configured to receive input (e.g., visual input) via the interface 1142. In one or more implementations, applicable for example to interfacing with a pixel array. The apparatus 1130 may also provide feedback information via the interface 1142 to facilitate encoding of the input signal.

The neuromorphic apparatus 1130 may be configured to provide output (e.g., an indication of recognized object or a feature, or a motor command, e.g., to zoom/pan the image array) via the interface 1144.

The apparatus 1130, in one or more implementations, may interface to external fast response memory (e.g., RAM) via high bandwidth memory interface 1148, thereby enabling storage of intermediate network operational parameters (e.g., spike timing, etc.). In one or more implementations, the apparatus 1130 may also interface to external slower memory (e.g., flash, or magnetic (hard drive)) via lower bandwidth memory interface 1146, in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576 entitled "DYNAMICALLY RECONFIGURABLE STOCHASTIC LEARNING APPARATUS AND METHODS", filed Jun. 4, 2012, incorporated herein by reference in its entirety.

Figure 11C:
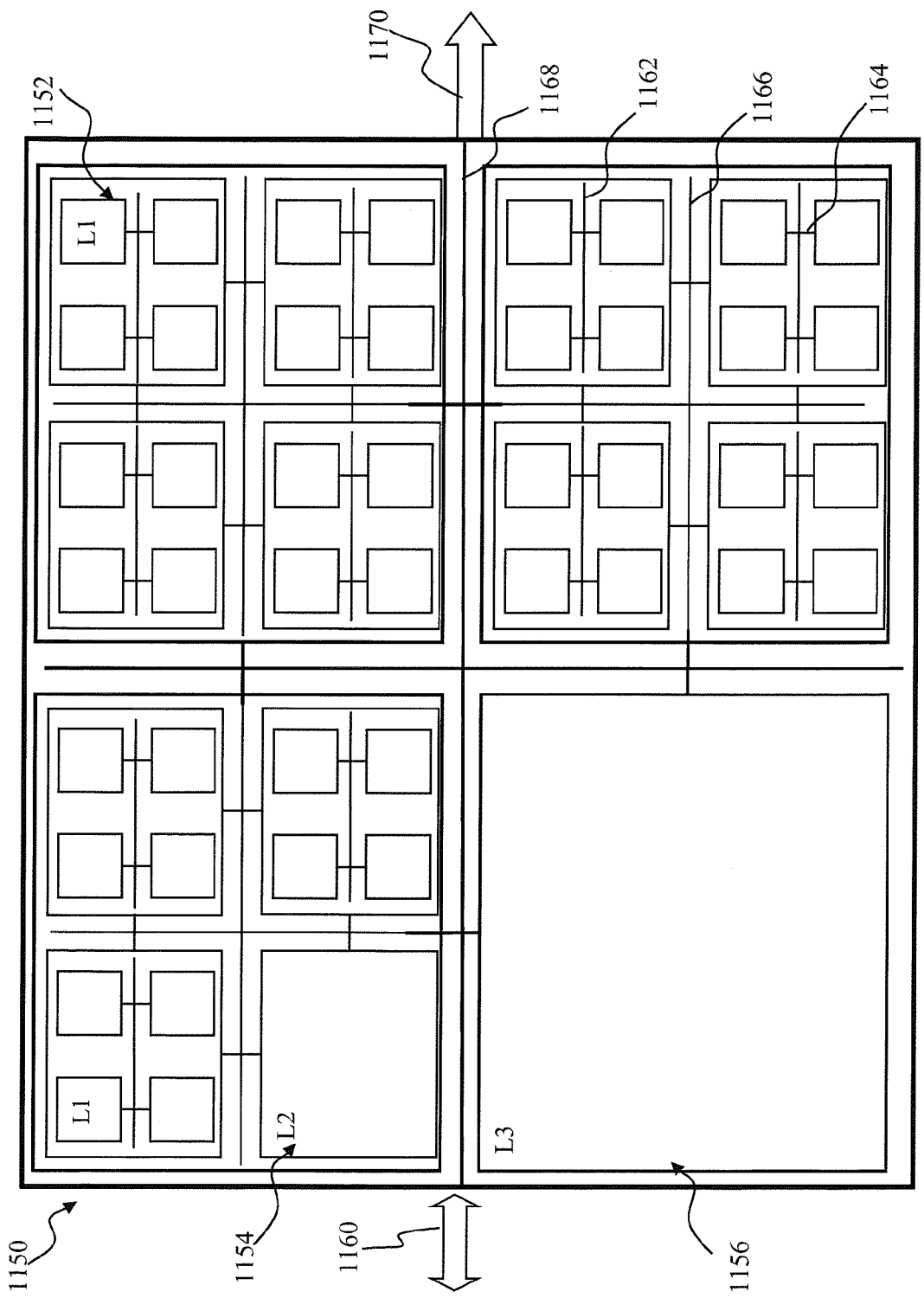
FIG. 11C is a block diagram illustrating a hierarchical neuromorphic computerized system architecture useful with salient feature detector apparatus configured in accordance with one or more implementations.

FIG. 11C, illustrates one implementation of cell-based hierarchical neuromorphic system architecture configured to implement salient feature detection. The neuromorphic system 1150 of FIG. 11C may comprise a hierarchy of processing blocks (cells block) 1140. In some implementations, the lowest level L1 cell 1152 of the apparatus 1150 may comprise logic and memory and may be configured similar to the micro block 1140 of the apparatus shown in FIG. 11B, supra. A number of cell blocks 1052 may be arranges in a cluster 1154 and communicate with one another via local interconnects 1162, 1164. Each such cluster may form higher level cell, e.g., cell denoted L2 in FIG. 11C. Similarly several L2 level clusters may communicate with one another via a second level interconnect 1166 and form a super-cluster L3, denoted as 1156 in FIG. 11C. The super-clusters 1156 may communicate via a third level interconnect 1168 and may form a higher-level cluster, and so on. It will be appreciated by those skilled in the arts that hierarchical structure of the apparatus 1150, comprising four cells-per-level, shown in FIG. 11C represents one exemplary implementation and other implementations may comprise more or fewer cells/level and/or fewer or more levels.

Different cell levels (e.g., L1, L2, L3) of the apparatus 1150 may be configured to perform functionality various levels of complexity. In one implementation, different L1 cells may process in parallel different portions of the visual input (e.g., encode different frame macro-blocks), with the L2, L3 cells performing progressively higher level functionality (e.g., edge detection, object detection). Different L2, L3, cells may perform different aspects of operating as well, for example, a robot, with one or more L2/L3 cells processing visual data from a camera, and other L2/L3 cells operating motor control block for implementing lens motion what tracking an object or performing lens stabilization functions.

The neuromorphic apparatus 1150 may receive visual input (e.g., the input 1002 in FIG. 10) via the interface 1160. In one or more implementations, applicable for example to interfacing with a latency encoder and/or an image array, the apparatus 1150 may provide feedback information via the interface 1160 to facilitate encoding of the input signal.

The neuromorphic apparatus 1150 may provide output (e.g., an indication of recognized object or a feature, or a motor command, e.g., to zoom/pan the image array) via the interface 1170. In some implementations, the apparatus 1150 may perform all of the I/O functionality using single I/O block (e.g., the I/O 1160 of FIG. 11C).

The apparatus 1150, in one or more implementations, may interface to external fast response memory (e.g., RAM) via high bandwidth memory interface (not shown), thereby enabling storage of intermediate network operational parameters (e.g., spike timing, etc.). The apparatus 1150 may also interface to a larger external memory (e.g., flash, or magnetic (hard drive)) via a lower bandwidth memory interface (not shown), in order to facilitate program loading, operational mode changes, and retargeting, where network node and connection information for a current task may be saved for future use and flushed, and previously stored network configuration may be loaded in its place, as described for example in co-pending and co-owned U.S. patent application Ser. No. 13/487,576, entitled "DYNAMICALLY RECONFIGURABLE STOCHASTIC LEARNING APPARATUS AND METHODS", incorporated supra.

Performance Results

Figure 9A:
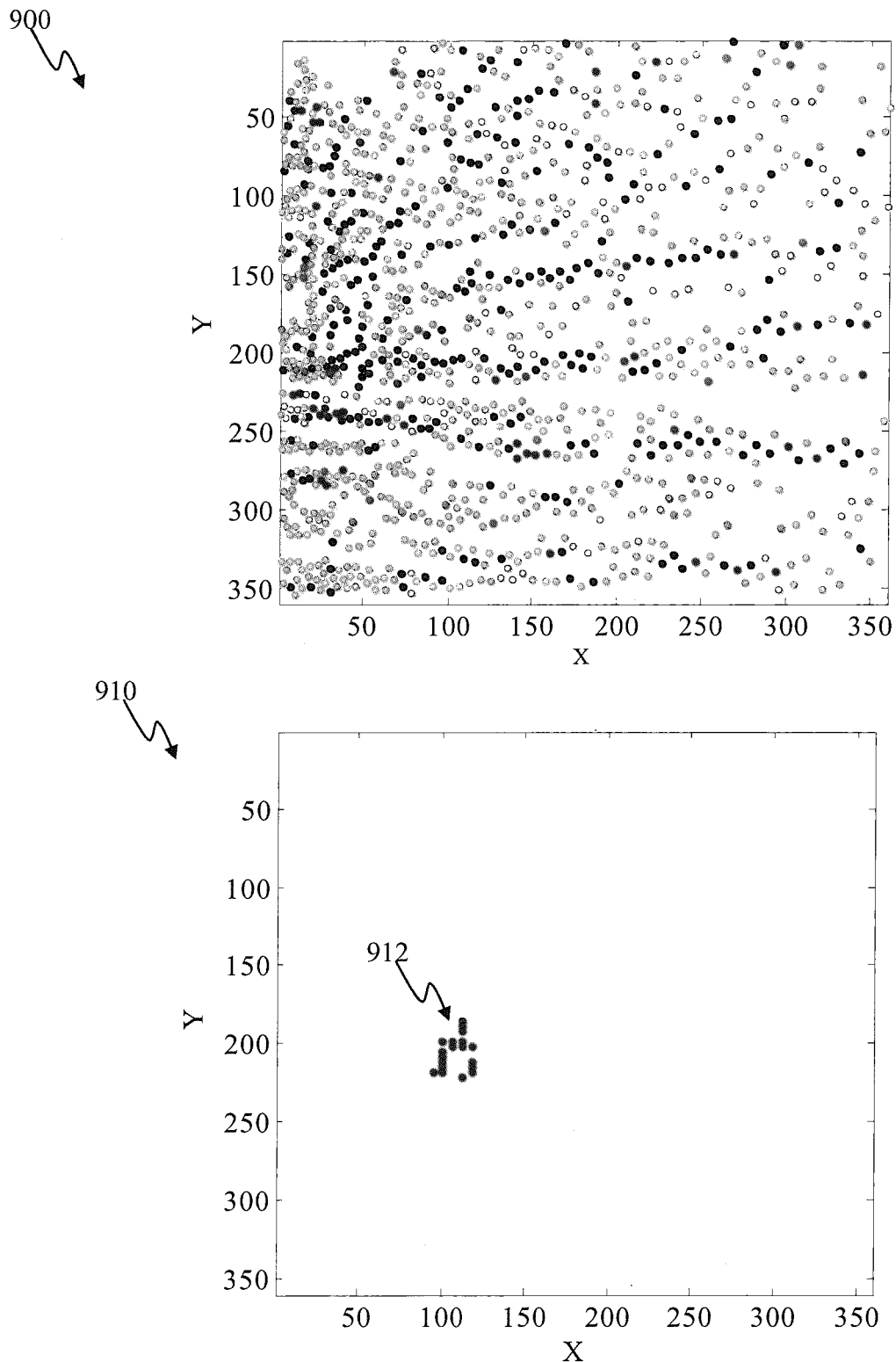
FIG. 9A is a plot illustrating detection of salient features using inhibition of late responding units, in accordance with one implementation of the disclosure.
Figure 9B:
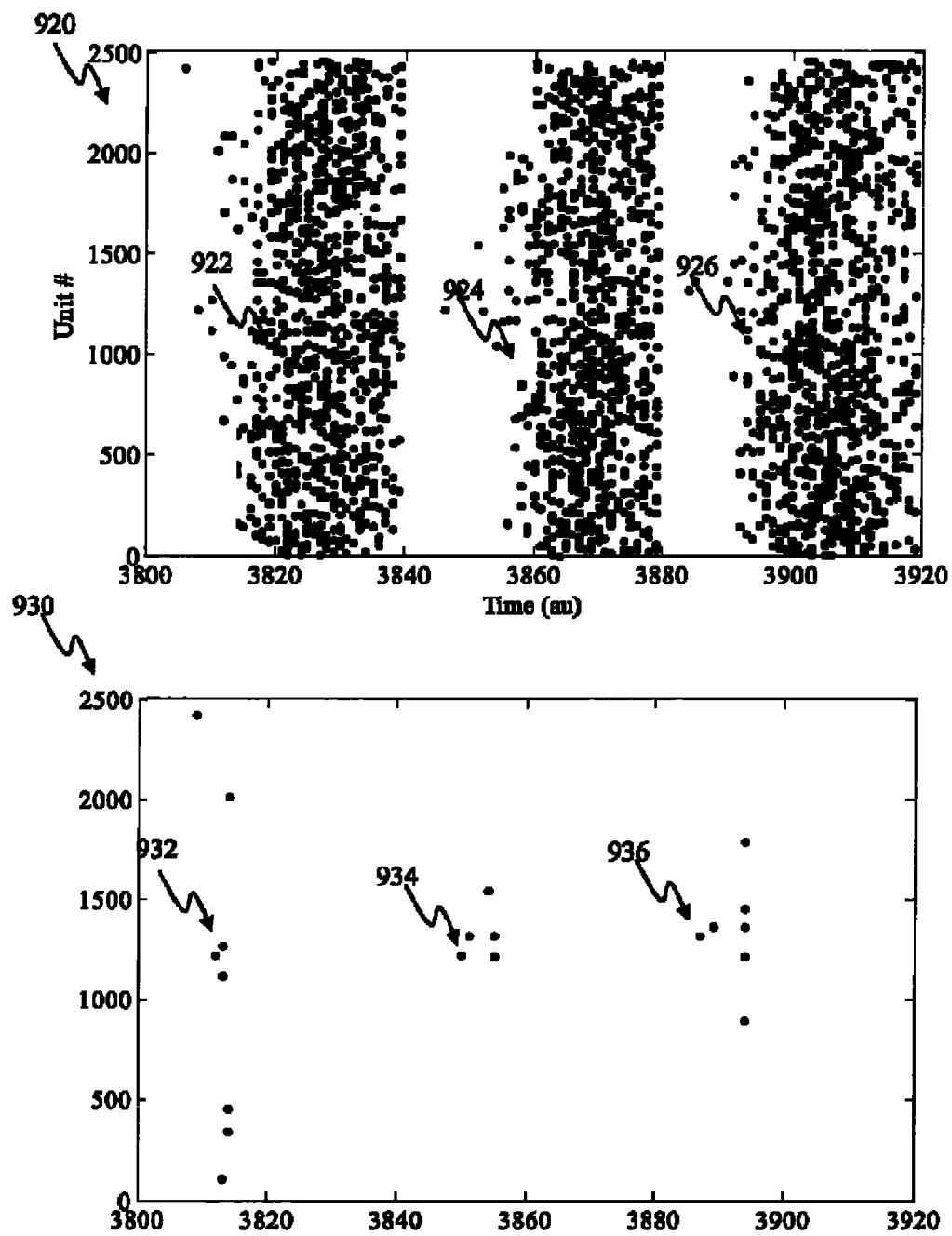
FIG. 9B is a plot illustrating frame background removal using inhibition of late responding units, in accordance with one implementation of the disclosure.

FIGS. 9A through 9B present performance results obtained during simulation and testing by the Assignee hereof, of exemplary salient feature detection apparatus (e.g., the apparatus 1000 of FIG. 10A) configured in accordance with the temporal-winner takes all methodology of the disclosure. Panel 900 of FIG. 9A presents sensory input, depicting a single frame of pixels of a size (X,Y). Circles within the frame 900 depict pixel brightness. The pixel array 900 comprises a representation of a runner that is not easily discernible among the background noise.

Pixel brightness of successive pixel frames (e.g., the frames 900) may be encoded by spiking neuron network, using any of applicable methodologies described herein. One encoding realization is illustrated in panel 920 of FIG. 9B comprising encoding output 922, 924, 926 of three consecutive frames. The frames are refreshed at about 25 Hz, corresponding to the encoding duration of 40 ms in FIG. 9B. The network used to encode data shown in FIG. 9B comprises 2500 excitatory units and a single inhibitory unit. Each dot within the panel 920 represents single excitatory unit spike in the absence of inhibitory TWTA mechanism of the present disclosure.

Panel 930 illustrates one example of performance of the temporal winner takes all approach of the disclosure, applied to the data of panel 920. The pulse groups 932, 934, 936 in panel 940 depict excitatory unit spikes that occur within the encoded output 922, 924, 926, respectively, within the saliency window, e.g., a time period between 1 and 10 ms (e.g., 5 ms in the exemplary implementation) prior to the generation of inhibition signal. The excitatory unit output is inhibited subsequent to generation of the inhibitory indications (not shown) that are based on the winner responses 932, 934, 936.

In some implementations, the winner response (e.g., the pulse group 932 in FIG. 9B) may be used to accurately detect the salient feature (e.g., the runner) within the frame 900. Panel 910 of FIG. 9A illustrates pixel representation of the runner, obtained from the data of panel 900, using the winner takes all pulse group 932 of FIG. 9B. The data presented in FIGS. 9A-9B are averaged over three frames to improve saliency detection. In some implementations, spatial averaging may be employed prior to the WTA processing in order to, inter alia, improve stability of the winner estimate. For the exemplary data shown in FIGS. 9A-9B, an irregular averaging mask comprising approximately 40 pixels was used to perform spatial averaging. The results presented in FIGS. 9A-9B illustrate that TWTA methodology of the disclosure is capable of extracting salient features, comprising a fairly low number of pixels (about 20 in panel 910 of FIG. 9A), from a fairly large (about 130,000 in panel 900 of FIG. 9A) and complex input population of pixels.

Exemplary Uses and Applications of Certain Aspects of the Disclosure

Various aspects of the disclosure may advantageously be applied to design and operation of apparatus configured to process sensory data.

The results presented in FIGS. 9A-9B confirm that the methodology of the disclosure is capable of effectively isolating salient features within sensory input. In some implementations, the salient feature detection capability may be used to increase signal-to-noise (SNR) ratio by, for example, removing spatially/and or temporally incoherent noise (e.g., 'salt and pepper') from input images. In some implementations, the salient feature detection capability may be used to remove non-salient features (e.g., image background), thereby facilitating image compression and/or SNR increase. The salient feature detection capability may also enable removal of a large portion of spikes from an encoded image, thereby reducing encoded data content, and effectuating image compression.

The principles described herein may be combined with other mechanisms of data encoding in neural networks, as described in for example U.S. patent application Ser. No. 13/152,084 entitled APPARATUS AND METHODS FOR PULSE-CODE INVARIANT OBJECT RECOGNITION", filed Jun. 2, 2011, and U.S. patent application Ser. No. 13/152,119, Jun. 2, 2011, entitled "SENSORY INPUT PROCESSING APPARATUS AND METHODS", and U.S. patent application Ser. No. 13/152,105 filed on Jun. 2, 2011, and entitled "APPARATUS AND METHODS FOR TEMPORALLY PROXIMATE OBJECT RECOGNITION", incorporated, supra.

Advantageously, exemplary implementations of the present innovation may be useful in a variety of applications including, without limitation, video prosthetics, autonomous and robotic apparatus, and other electromechanical devices requiring video processing functionality. Examples of such robotic devises are manufacturing robots (e.g., automotive), military, medical (e.g. processing of microscopy, x-ray, ultrasonography, tomography). Examples of autonomous vehicles include rovers, unmanned air vehicles, underwater vehicles, smart appliances (e.g. ROOMBA®), etc.

Implementations of the principles of the disclosure are applicable to video data processing (e.g., compression) in a wide variety of stationary and portable video devices, such as, for example, smart phones, portable communication devices, notebook, netbook and tablet computers, surveillance camera systems, and practically any other computerized device configured to process vision data Implementations of the principles of the disclosure are further applicable to a wide assortment of applications including computer human interaction (e.g., recognition of gestures, voice, posture, face, etc.), controlling processes (e.g., an industrial robot, autonomous and other vehicles), augmented reality applications, organization of information (e.g., for indexing databases of images and image sequences), access control (e.g., opening a door based on a gesture, opening an access way based on detection of an authorized person), detecting events (e.g., for visual surveillance or people or animal counting, tracking), data input, financial transactions (payment processing based on recognition of a person or a special payment symbol) and many others.

Advantageously, various of the teachings of the disclosure can be used to simplify tasks related to motion estimation, such as where an image sequence is processed to produce an estimate of the object position and velocity (either at each point in the image or in the 3D scene, or even of the camera that produces the images). Examples of such tasks include ego motion, i.e., determining the three-dimensional rigid motion (rotation and translation) of the camera from an image sequence produced by the camera, and following the movements of a set of interest points or objects (e.g., vehicles or humans) in the image sequence and with respect to the image plane.

In another approach, portions of the object recognition system are embodied in a remote server, comprising a computer readable apparatus storing computer executable instructions configured to perform pattern recognition in data streams for various applications, such as scientific, geophysical exploration, surveillance, navigation, data mining (e.g., content-based image retrieval). Myriad other applications exist that will be recognized by those of ordinary skill given the present disclosure.

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed:

1. A computerized neuron-based network image processing apparatus comprising a storage medium, said storage medium comprising a plurality of executable instructions being configured to, when executed:
   provide feed-forward stimulus associated with a first portion of an image to at least a first plurality of neurons and second plurality of neurons of a network;
   provide another feed-forward stimulus associated with another portion of said image to at least a third plurality of neurons of said network;
   cause said first plurality of neurons to encode a first attribute of said first portion into a first plurality of pulse latencies relative to an image onset time;
   cause said second plurality of neurons to encode a second attribute of said first portion into a second plurality of pulse latencies relative to said image onset time, said second attribute characterizing a different physical characteristic of said image than said first attribute;
   determine an inhibition indication, based at least in part on one or more pulses associated with said first plurality and said second plurality of pulse latencies, that are characterized by latencies that are within a latency window; and
   based at least in part on said inhibition indication, prevent encoding of said another portion by said third plurality of neurons.

2. The apparatus of claim 1, wherein:
   said latency window is determined relative to said onset time; and
   said one or more pulses are characterized by latency values being lower compared to other pulses associated with said first plurality and said second plurality of pulse latencies whose values are outside said latency window.

3. The apparatus of claim 1, wherein:
   said first portion of said image comprises a plurality of pixels associated with a feature;
   said first attribute comprises luminance of pixels within said plurality of pixels; and
   said second attribute comprises velocity of pixels within said plurality of pixels.

4. The apparatus of claim 3, wherein:
   said inhibition indication is configured based at least in part on at least two or more pulses associated with said first plurality and said second plurality, said at least two or more pulses each having a pulse latency within said window, said at least two or more pulses corresponding to at least two pixels of said plurality of pixels; and
   said prevention of said encoding of said another portion by said third plurality of neurons is characterized by an absence of pulses associated with pixels of said image that are spatially outside of said portion.

5. The apparatus of claim 3, wherein said inhibition indication is effectuated at least by an inhibition trace, said inhibition trace being incremented responsive to an occurrence of a pulse latency of said first plurality of pulse latencies and said second plurality of pulse latencies being within said latency window.

6. The apparatus of claim 4, wherein
   said at least two or more pulses comprise pulses associated with said first plurality; and
   said at least two pixels are characterized by a common luminance.

7. The apparatus of claim 6, wherein:
   said inhibition indication is further configured based at least in part on another two or more pulses associated with said second plurality of pulse latencies having a second pulse latency within said window, said another two or more pulses corresponding to said two pixels of said plurality of pixels; and
   said at least two pixels are characterized by a common rate of displacement.

8. The apparatus of claim 1, wherein said plurality of executable instructions are further configured to, when executed:
   provide another feed-forward stimulus associated with a first portion of a second image to said first plurality of neurons, said second image preceding said image, said image and said second image comprising a representation of a feature;
   cause said first plurality of neurons to encode said first attribute of said first portion of said second image into a third plurality of pulse latencies relative to an onset time associated with said second image;
   said first portion of said image and said first portion of said second image having at least two pixels characterized by a common value of said first attribute; and
   wherein said inhibition indication is configured based at least in part on (i) at least one or more pulses associated with said first plurality and said second plurality of pulse latencies; and (ii) at least another pulse associated with said third plurality of pulse latencies having a pulse latency within said window.

9. A computerized method of detection of one or more features of an image by a spiking neuron network, the method comprising:
   providing feed-forward stimulus comprising a spectral parameter of said image to a first portion and a second portion of said network;
   based at least in part on said providing said stimulus, causing generation of a plurality of pulses by said first portion, said plurality of pulses configured to encode said parameter into a pulse latency;
   generating an inhibition signal based at least in part on two or more pulses of said plurality of pulses being proximate one another within a time interval; and
   based at least in part on said inhibition indication, suppressing responses to said stimulus by at least some neurons of said second portion.

10. The method of claim 9, wherein:
    said providing said feed-forward stimulus is characterized by a stimulus duration, said stimulus duration being greater than said time interval; and
    said suppressing responses is characterized by an absence of responses from said second portion during said stimulus duration.

11. The method of claim 9, wherein:
said providing said feed-forward stimulus is characterized by a stimulus duration, said stimulus duration being greater than said time interval; and
said suppressing responses are capable of reducing a number of responses from said second portion during said stimulus duration as compared to a number of responses that are generated by said second portion during said stimulus duration and responsive to said stimulus.

12. The method of claim 9, wherein:
said providing said feed-forward stimulus is characterized by a stimulus duration, said stimulus duration being greater than said time interval; and
said suppressing responses reduces a probability of response generation by neurons within said second portion during said stimulus duration and responsive to said stimulus.

13. The method of claim 9, wherein:
said providing said feed-forward stimulus causes generation of a burst of pulses by at least one neuron of said network; and
said suppressing responses suppresses at least a portion of pulses within said burst from being generated responsive to said stimulus.

14. The method of claim 9, wherein said suppressing responses is configured based at least in part on a number of said two or more pulses.

15. The method of claim 9, wherein;
said providing said feed-forward stimulus is characterized by an onset time and a stimulus duration, said stimulus duration being greater than said time interval; and
said suppressing responses is configured based at least in part on a time interval between said onset time and generation of said two or more pulses.

16. A spiking neuron sensory processing system, comprising:
an encoder apparatus comprising:
a plurality of excitatory neurons configured to encode a feed-forward sensory stimulus into a plurality of pulses; and
at least one inhibitory neuron configured to provide an inhibitory indication to one or more of said plurality of excitatory neurons over one or more inhibitory connections;
wherein:
said inhibitory indication is based at least in part on two or more of said plurality of pulses being received by said at least one inhibitory neuron over one or more feed-forward connections; and
said inhibitory indication is configured to prevent at least one of said plurality of excitatory neurons from generating, subsequent to said provision of said inhibitory indication, at least one pulse during a stimulus interval.

17. The system of claim 16, wherein:
said inhibitory indication is characterized by an inhibition trace, said inhibition trace configured to be:
incremented responsive to said receipt of said two or more of said plurality of pulses;
decayed with time subsequent to said increment; and
said preventing is based at least in part on a value of said inhibition trace exceeding an inhibitory threshold.

18. The system of claim 17, wherein:
said feed-forward stimulus is provided to said plurality of excitatory neurons over a stimulus interval;
said two or more of said plurality of pulses are received within an interval, said interval being greater than zero and smaller than one quarter of said stimulus interval; and
said time decay is effectuated throughout at least a portion of said stimulus interval.

19. The system of claim 17, wherein:
individual ones of the one or more inhibitory connections is characterized by a connection weight; and
said increment of said inhibition trace is based on increasing the connection weight.

20. The system of claim 16, wherein said inhibitory indication is capable of reducing a number of the plurality of pulses associated with the feed-forward sensory stimulus thereby effectuating sensory stimulus compression.

21. The system of claim 16, wherein:
said feed-forward sensory stimulus comprises a background portion; and
said inhibitory indication is capable of preventing the background portion from being encoded into the plurality of pulses associated with the feed-forward sensory stimulus.

22. The system of claim 21, wherein
said background portion comprises an uncorrelated sensory input component;
said feed-forward sensory stimulus further comprises a coherent signal component;
the plurality of pulses constitute an encoded input; and
said inhibitory indication is capable of preventing the uncorrelated sensory input component from being encoded into the plurality of pulses, thereby effectuating an increased signal to noise ratio of the encoded input.

* * * * *